United States Patent
Yazawa et al.

(10) Patent No.: US 9,227,423 B2
(45) Date of Patent: Jan. 5, 2016

(54) IMAGE PROCESSING APPARATUS, INKJET PRINTING APPARATUS, AND INKJET PRINTING METHOD

(71) Applicant: CANON KABUSHIKI KAISHA, Tokyo (JP)

(72) Inventors: Takeshi Yazawa, Yokohama (JP); Makoto Torigoe, Tokyo (JP); Hinako Ojiro, Wynnewood, PA (US); Kei Yoshizawa, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 13/871,481

(22) Filed: Apr. 26, 2013

(65) Prior Publication Data

US 2013/0300791 A1 Nov. 14, 2013

(30) Foreign Application Priority Data

May 8, 2012 (JP) ................................. 2012-106991

(51) Int. Cl.
*B41J 2/21* (2006.01)
*H04N 1/54* (2006.01)

(52) U.S. Cl.
CPC ................. *B41J 2/2114* (2013.01); *H04N 1/54* (2013.01)

(58) Field of Classification Search
CPC ............ B41J 2/2114; B41J 2/21; B41J 2/195; B41J 2/205; B41J 2/2056
USPC .......................................................... 347/15
See application file for complete search history.

(56) References Cited

U.S. PATENT DOCUMENTS

| | | | |
|---|---|---|---|
| 6,341,833 B1 | 1/2002 | Liu et al. | |
| 6,877,850 B2 * | 4/2005 | Ishimoto et al. | 347/100 |
| 7,287,830 B2 | 10/2007 | Ide et al. | |
| 8,485,629 B2 | 7/2013 | Iritani et al. | |
| 8,579,401 B2 | 11/2013 | Iritani et al. | |
| 8,714,678 B2 | 5/2014 | Konno et al. | |
| 8,888,204 B2 | 11/2014 | Iritani et al. | |
| 2007/0211097 A1* | 9/2007 | Yamazaki et al. | 347/14 |
| 2011/0242176 A1* | 10/2011 | Iritani et al. | 347/15 |
| 2011/0286020 A1 | 11/2011 | Ishikawa et al. | |

(Continued)

FOREIGN PATENT DOCUMENTS

| | | |
|---|---|---|
| JP | 2001-138555 A | 5/2001 |
| JP | 2011218564 A | 11/2011 |

(Continued)

*Primary Examiner* — Geoffrey Mruk
*Assistant Examiner* — Scott A Richmond
(74) *Attorney, Agent, or Firm* — Fitzpatrick, Cella, Harper & Scinto

(57) ABSTRACT

In a color mode, among clear ink data CL1 and CL2, only the data CL2 is set to a uniform use amount of 20%, while the use amount for the data CL1 is set to zero. Meanwhile, in a monochrome photo mode, the data CL1 indicates a usage of 10% to 40% near a white point, but starting at the intermediate gradations the data CL1 use amount decreases while the data CL2 use amount increases, with a data CL2 use amount of 20% near a black point. In so doing, it is possible to sufficiently suppress bronzing in the color mode where coloring ink data exists, without imparting a particularly strong unnatural look except for specific colors. Meanwhile, in the monochrome photo mode where coloring ink data does not exist, high-level suppression of bronzing is possible, at the cost of a slight reduction in the glossiness of the printed material.

13 Claims, 23 Drawing Sheets

(56) References Cited

U.S. PATENT DOCUMENTS

| | | | |
|---|---|---|---|
| 2012/0050370 A1* | 3/2012 | Iritani et al. | 347/15 |
| 2013/0010025 A1 | 1/2013 | Kosaka et al. | |
| 2013/0084439 A1 | 4/2013 | Ojiro et al. | |

FOREIGN PATENT DOCUMENTS

| | | |
|---|---|---|
| JP | 2012051187 A | 3/2012 |
| JP | 2012051188 A | 3/2012 |
| JP | 2012051196 A | 3/2012 |

\* cited by examiner

IMAGE PROCESSING APPARATUS, INKJET PRINTING APPARATUS, AND INKJET PRINTING METHOD

BACKGROUND OF THE INVENTION

1. Field of the Invention

The present invention relates to an image processing apparatus, an inkjet printing apparatus and printing method, and more particularly, to technology that suppresses bronzing in a printed image using what is called clear ink, which substantially does not contain color material.

2. Description of the Related Art

A technology for suppressing bronzing is known in which the bronzing is reduced by controlling the usage rate of color inks, as described in Japanese Patent Laid-Open No. 2001-138555. Specifically, whether or not bronzing will occur is determined based on the lightness of the image to be printed and the ink usage rates, and bronzing is suppressed by changing the ink usage rates according to the determination result.

Typically, when observing printed material, an observer observes light that was radiated onto the printed material from a light source and then reflected from the printed material. The observed color differs according to the observation angle. FIG. 1 is a diagram for explaining the difference in two types of reflected light in the case of observing printed material from two different angles. In FIG. 1, the reflected light observed in the direction A is specular light as observed from a direction of specular reflection with respect to the light source, and an image of the light source appearing on the printed material is observed. On the other hand, the reflected light observed in the direction B is reflected light that passed through the printed material and reflected out, or in other words diffuse light, and a color reproduced by the color material is observed. Also, in the case of observing the printed material from the direction A, the light source may be recognized as appearing in a different color from the color of the light source. This is perceived as bronzing.

The method described in the above Japanese Patent Laid-Open No. 2001-138555 has the following problems when observing such printed material. Different tints in the two types of observed light illustrated in FIG. 1 provide feeling of strangeness to the observer. Typically, printing with cyan ink causes a comparatively large difference in the tints in the two types of observed light, and the perception of the specular light becomes a red color different from cyan. In this case, when reproducing the high saturation color of cyan that is one of three primary colors, substituting this cyan with ink of a different color is difficult. For this reason, the technology of changing the usage rate of color inks described in Japanese Patent Laid-Open No. 2001-138555 cannot be applied.

Regarding differences in the tint of observed light as above, the use of clear ink which does not contain color material is known as a technology enabling a reduction in the tint differences of specular light while suppressing bronzing. FIGS. 2A to 2D are diagrams explaining the principle of suppressing bronzing by applying clear ink to printed material after image formation. FIG. 2A illustrates how light reflects normally off the surface of the coloring ink layer. Note that for the sake of simplicity, light that is transmitted through the coloring ink layer and reflected off surface of the print medium has been omitted. In contrast, FIG. 2B illustrates the case of forming a uniform clear ink layer over the coloring ink layer. There exist light 1003 that reflects off the surface of the clear ink layer 1001, and light 1004 that passes through the clear ink layer 1001, reflects off the surface of the cyan coloring ink layer 1002, and exits out from the clear ink layer 1001. The light path length of the light 1004 is longer than the light 1003 by a distance equivalent to passing through the clear ink layer 1001. The shift in optical phase based on the light path difference strengthens or weakens the intensity at a specific wavelength to produce light interference, and the tints of bronzing become different. Utilizing this phenomenon, changing the clear ink use amount can vary the coverage of clear ink over the coloring ink layer and the thickness of the clear ink layer (see FIGS. 2C and 2D). Thus, the light interference state can be varied to control hues of bronzing color.

However, simply applying clear ink to printed material after printing does not reduce the perception of the bronzing itself, even though the hue of bronzing can be controlled.

For example, with monochrome image printing, if bronzing is perceived when observing printed material, the reflected light will be recognized as having color although chromatic color is hardly used in the image. This may provide a comparatively strong feeling of strangeness. In other words, although applying clear ink to a monochrome photo image after printing enables the suppression of bronzing to some degree, with monochrome image printing that hardly uses chromatic color at all, it is important to reduce the perception of color itself.

There is another problem in that simply applying clear ink to an image after printing cannot suppress bronzing in a way that suitably corresponds to various images or respective printing modes, for example.

SUMMARY OF THE INVENTION

An object of the present invention is to provide an image processing apparatus, an inkjet printing apparatus and an inkjet printing method that are able to suppress bronzing in a way that suitably corresponds to various images or respective printing modes, such as suppressing bronzing to a high level in monochrome image printing.

In a first aspect of the present invention, there is provided an image processing apparatus for forming an image on a unit area of a print medium by performing a printing operation of a first printing mode and a second printing mode using a print head for ejecting coloring ink comprising coloring material and clear ink to the print medium, the apparatus comprising: a setting unit configured to set a mode including a first and second mode; and a determining unit configured to determine an use amount of the coloring ink, a first use amount of the clear ink which is an use amount of the clear ink for the printing operation that starts applying the clear ink to the unit area before completing applying the use amount of coloring ink to the unit area, and a second use amount of the clear ink which is an use amount of the clear ink for the printing operation that starts applying the clear ink to the unit area after completing applying the use amount of coloring ink to the unit area, based on an image data representing a color of the image, according to the mode set by the setting unit, wherein the determining unit determines the first use amount and the second use amount such that the first and second use amount determined based on the image data representing a color of an intermediate gradation image are different between the first printing mode and the second printing mode.

In a second aspect of the present invention, there is provided an image processing method of forming an image on a unit area of a print medium by performing a printing operation of a first printing mode and a second printing mode using a print head for ejecting coloring ink comprising coloring material and clear ink to the print medium, the method comprising: a setting step of setting a mode including a first and second mode; and a determining step of determining an use amount of the coloring ink, a first use amount of the clear ink which is an use amount of the clear ink for the printing operation that starts applying the clear ink to the unit area before completing applying the use amount of coloring ink to the unit area, and a second use amount of the clear ink which is an use amount of the clear ink for the printing operation that starts applying the clear ink to the unit area after completing applying the use amount of coloring ink to the unit area, based on an image data representing a color of the image, according to the mode set by the setting step, wherein the determining step determines the first use amount and the second use amount such that the first and second use amount determined based on the image data representing a color of an intermediate gradation image are different between the first printing mode and the second printing mode.

In a third aspect of the present invention, there is provided an image processing apparatus for forming an image on a unit area of a print medium by performing a printing operation of a first printing mode and a second printing mode using a print head for ejecting coloring ink comprising coloring material and clear ink to the print medium, the apparatus comprising: a setting unit configured to set a mode including a first and second mode; and a determining unit configured to determine an use amount of the coloring ink, a first use amount of the clear ink which is an use amount of the clear ink for the printing operation that starts applying the clear ink to the unit area before completing applying the use amount of coloring ink to the unit area, and a second use amount of the clear ink which is an use amount of the clear ink for the printing operation that starts applying the clear ink to the unit area after completing applying the use amount of coloring ink to the unit area, based on an image data representing a color of the image, according to the mode set by the setting unit, wherein the determining unit determines the first use amount and the second use amount such that with respect to a gray line showing gradations from a white to a black, which is defined by the image data, the first use amount decreases and the second use amount increases, from an intermediate gradation.

According to the above configuration, it becomes possible to suppress bronzing in a way that suitably corresponds to various images or respective printing modes, such as suppressing bronzing to a high level in monochrome image printing.

Further features of the present invention will become apparent from the following description of exemplary embodiments (with reference to the attached drawings).

DESCRIPTION OF THE EMBODIMENTS

Hereinafter, embodiments of the present invention will be described in detail and with reference to the attached drawings.

(Bronzing Evaluation Method)

Before describing the embodiment of the present invention, a method of evaluating bronzing will be described. Bronzing may be measured using the Gonio-Spectrophotometric Color Measurement System (GCMS-4) from Murakami Color Research Laboratory, for example. A printed image is irradiated with light from a 45° angle, and by sensing light at a 45° position in the opposite direction, the spectral intensity of the specular light is measured. The chroma of the specular light is then computed from the measured spectral intensity. The less the specular light is colored, the smaller the measured value for the chroma of the specular light becomes.

Figure 1:
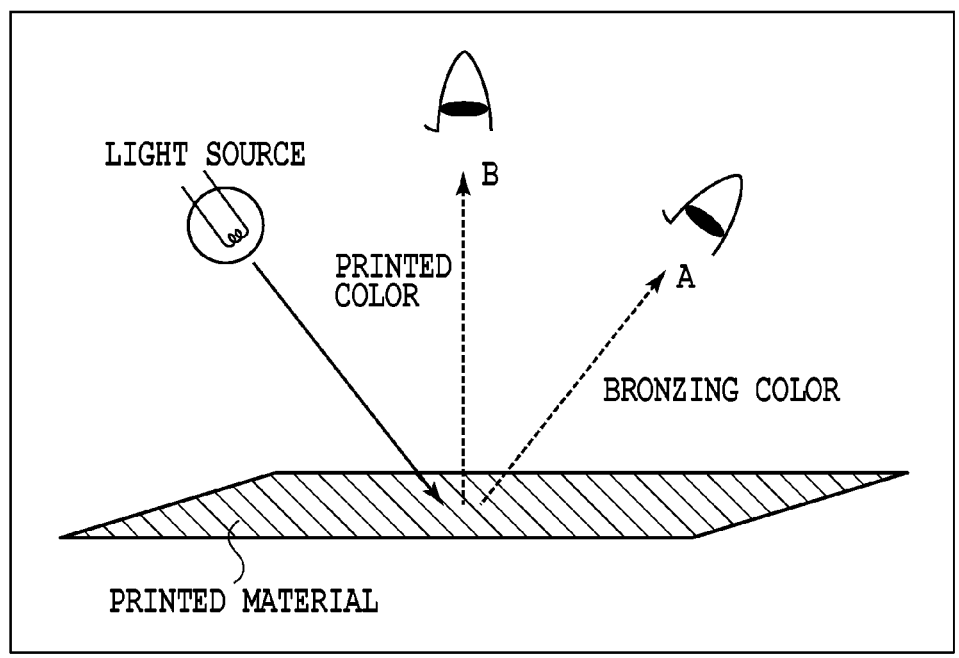
FIG. 1 is a diagram for explaining the difference in two types of reflected light in the case of observing printed material from two different angles.
Figure 2A:
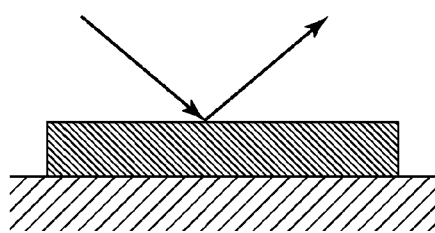
FIGS. 2A to 2D are diagrams explaining the principle of suppressing bronzing by applying clear ink to printed material after image formation.
Figure 2B:
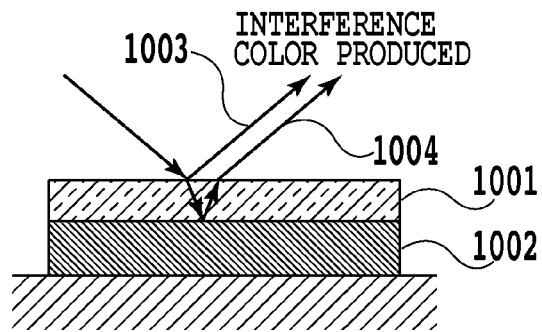
Figure 2C:
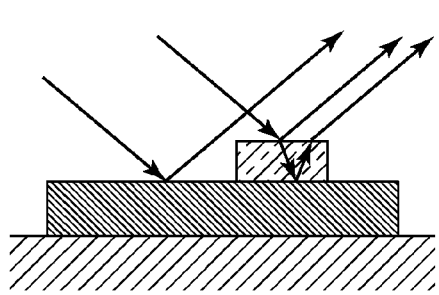
Figure 2D:
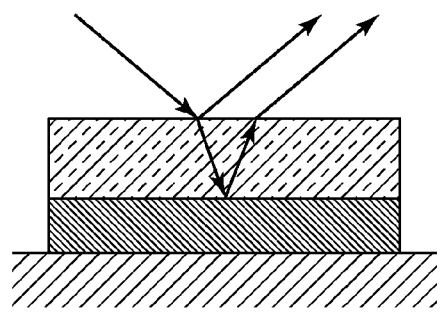
Figure 3:
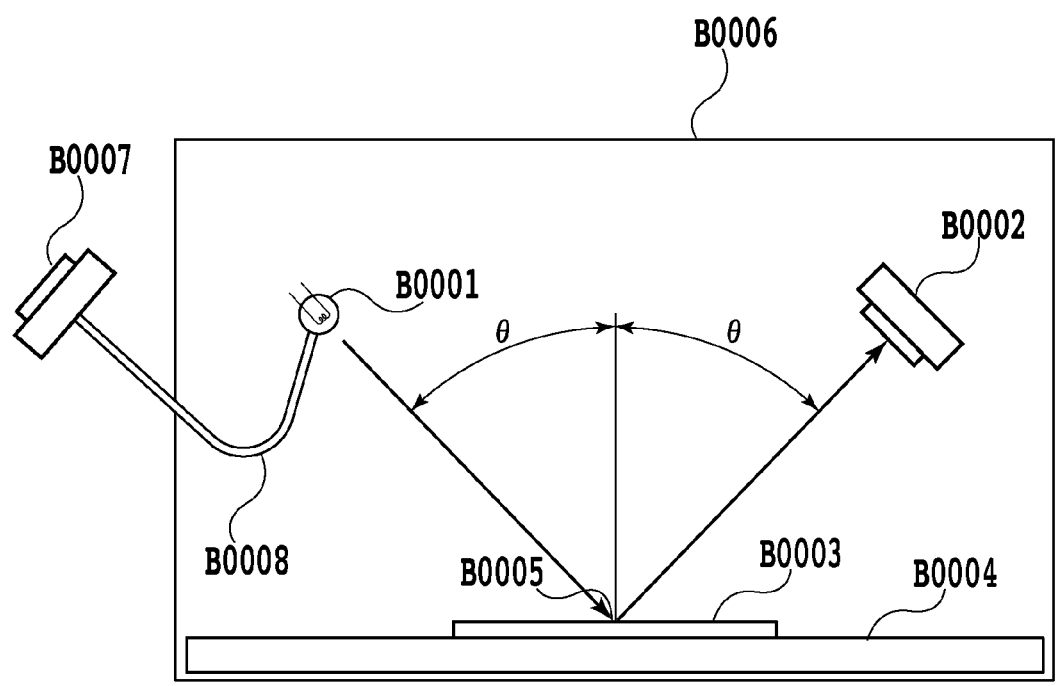
FIG. 3 is a diagram that schematically illustrates a bronzing measuring system.

FIG. 3 is a diagram that schematically illustrates a measuring system. In FIG. 3, B0001 represents lighting equipment that illuminates a print medium B0003 to be evaluated. B0002 represents a photodetector that detects reflected light from the print medium B0003 to be evaluated. The photodetector B0002 is positioned opposite the lighting equipment at the same tilt angle θ with respect to the normal line of the print medium B0003, or in other words, the direction of specular reflection. B0004 represents a stationary platform that holds the print medium B0003 in place, upon which is printed a patch to be evaluated. B0005 represents a measurement site measured by the photodetector B0002. B0006 illustrates a light shielding member for shutting out external light.

The spectral intensity of specular light from the print medium B0003 measured by the photodetector B0002 may be expressed as:

$$R_x(\lambda).$$

Tristimulus values Xx, Yx, Zx for the specular light are computed from the spectral intensity. In addition, from the specular tristimulus values of the print medium B0003 to be evaluated as detected by the photodetector B0002 and the tristimulus values of the lighting B0001, specular L*a*b* values for the print medium is computed on the basis of JIS Z 8729.

Figure 4:
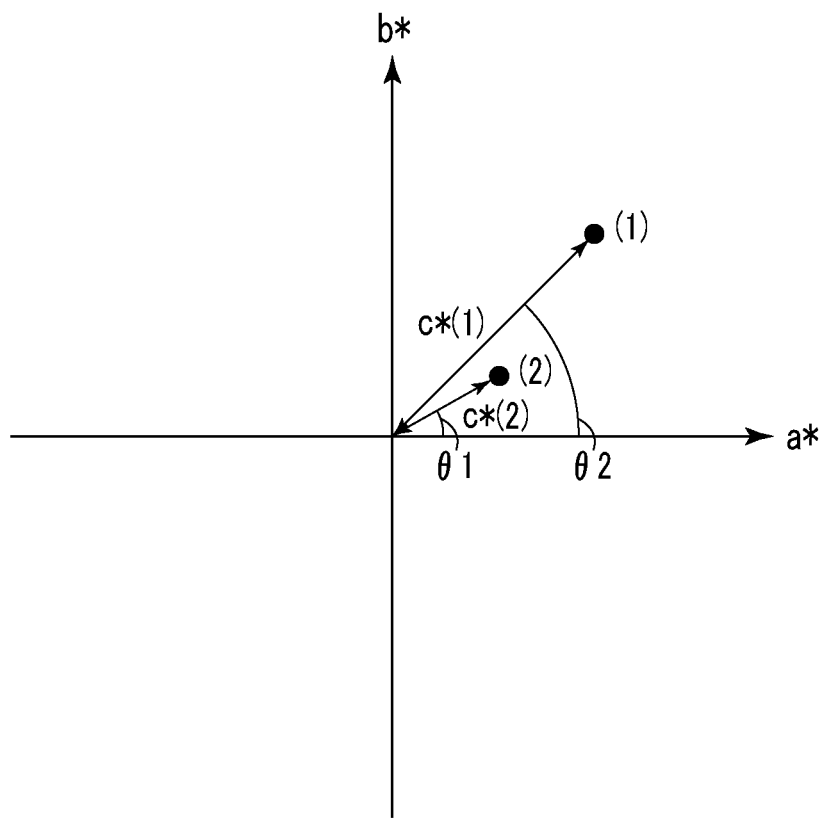
FIG. 4 is a diagram plotting the results of measuring two colors on a printed surface according to the above measuring method onto the a*b* plane.

FIG. 4 is a diagram illustrating, on the a*b* plane, L*a*b* values obtained as a result of respectively measuring two colors on a printed surface according to the above measuring method. The point labeled (1) in FIG. 4 represents a plot of the L*a*b* values (specular values; hereinafter also called the bronzing color) obtained as a result of measuring a color with a noticeable bronzing appearance, while the point labeled (2) represents a plot of the bronzing color for a color having a comparatively less noticeable bronzing appearance. C*(1) and C*(2) indicate the results of calculating the chroma $C^* = \sqrt{a^{*2}+b^{*2}}$ from the L*a*b* values of these bronzing colors. A larger C* value indicates a bronzing color with greater chroma, which is more noticeable as bronzing. Also, in FIG. 4, θ1 and θ2 are obtained by calculating the hue angle $\theta = \tan^{-1}(a^*/b^*)$ from the L*a*b* of the bronzing colors. By computing the hue and chroma of such bronzing colors on the a*b* plane in this way, similarly to the L*a*b* of diffuse light when measuring ordinary color, it is possible to quantify bronzing.

(Apparatus Configuration)

Figure 5:
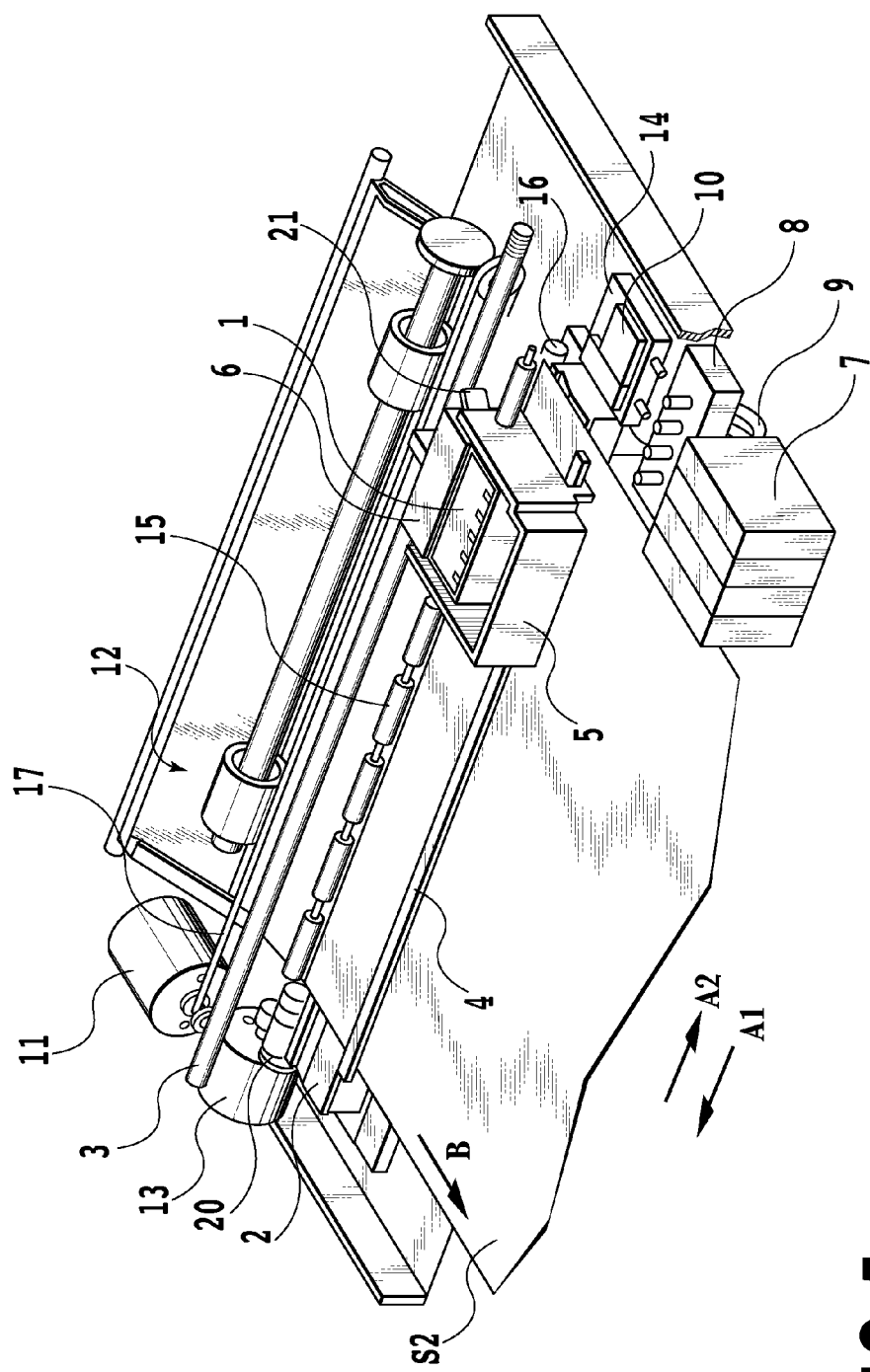
FIG. 5 is a perspective view illustrating a configuration of an inkjet printing apparatus according to an embodiment of the present invention.

FIG. 5 is a perspective view illustrating a configuration of an inkjet printing apparatus according to an embodiment of the present invention. After inserting a print medium via a feed tray 12, the printing apparatus of the present embodiment prints an image or the like while intermittently conveying the print medium in the direction indicated by the arrow B, and discharges the print medium into a discharge tray.

The print head 1 mounted on the carriage 5 is able to print an image onto a print medium S2 by ejecting ink from nozzles provided on the print head while moving along a guide rail 4 in the direction of the arrows A1 and A2. The print head 1 includes, for example, multiple nozzle groups corresponding to respectively different colors of ink. For example, there maybe nozzle groups for ejecting a total of 10 colors: the coloring inks cyan (C), magenta (M), yellow (Y), light cyan (LC), light magenta (LM), red (R), photo black (PBk), gray (Gy), and matte black (MBk), and clear ink (CL; ink that substantially does not contain color material). Inks for these respective colors, including clear ink, are stored in ink tanks (not illustrated), and supplied to the print head 1 from these ink tanks. Also, the ejection volume of the print head 1 is approximately the same for each color, at 4 pl (pico-little). Additionally, in the present embodiment, the ink tanks and the print head 1 are integrated to constitute a head cartridge 6, with the head cartridge 6 mounted onto the carriage 5.

By transferring driving force from a carriage motor 11 to the carriage 5 with a timing belt 17, the carriage 5 is made to move back and forth along a guide axle 3 and the guide rail 4 in the direction of the arrows A1 and A2 (the main scan direction). During this carriage movement, the position of the carriage 5 is detected by an encoder sensor 21 provided on the carriage 5 reading a linear scale 19 provided along the carriage movement direction. In addition, a print medium is printed on by ejecting ink from the nozzles of the print head at timings corresponding to the detected signal. For every scan of the print head, the print medium S2 supplied by the feed tray 12 is conveyed by a given amount. In other words, the print medium S2 is held between a conveyance roller 16 and a pinch roller 15, and in addition, is conveyed by a given amount in the direction of the arrow B (the sub-scan direction) due to the conveyance roller 16 being driven by the driving force from a conveyance motor 13 via a linear wheel 20. A head cap 10 and a recovery unit 14 are provided at a home position provided at an edge of the print head's movement range, and a recovery process for the print head 1 is intermittently conducted as necessary.

When the printing for a single sheet of print medium finishes by repeating the operations described above, the print medium is discharged, thus completing the printing of a single sheet. At this time, in a printing mode that uses the clear ink CL, printing is conducted with bidirectional scans indicated by the arrows A1 and A2, for example, in accordance with the arrangement of nozzle arrays for the 10 colors of ink in the print head, as discussed later with drawings such as FIG. 14. Also, with the multi-pass printing discussed later with drawings such as FIG. 8, the clear ink CL is ejected afterwards onto the areas printed with coloring inks. By controlling the respective amounts of the clear ink CL ejected before and after printing with these coloring inks, it becomes possible to reduce bronzing.

(Ink Composition)

The respective components constituting the pigment inks used by the inkjet printing apparatus of the present embodiment will now be described.

(Aqueous Medium)

An aqueous medium containing water and a water-soluble organic solvent is preferably used for the inks used in the present invention. The content of water-soluble organic solvent in each of the inks (mass percentage) is preferably between 3.0% w/w and 50.0% w/w inclusive with respect to the total mass of the ink. Additionally, the content of water in each of the inks (mass percentage) is preferably between 50.0% w/w and 95.0% w/w inclusive with respect to the total mass of the ink.

Specifically, potential examples of substances usable as the water-soluble organic solvent include: C1-C6 alkyl alcohols such as methanol, ethanol, propanol, propanediol, butanol, butanediol, pentanol, pentanediol, hexanol, and hexanediol; amides such as dimethylformamide and dimethylacetamide; ketones or ketoalcohols such as acetone and diacetone alcohol; ethers such as tetrahydrofuran and dioxane; polyalkylene glycols such as polyethylene glycol, polypropylene glycol and others with mean molecular weights of 200, 300, 400, 600, and 1000; alkylene glycols having a C2-C6 alkylene base, such as ethylene glycol, propylene glycol, butylene glycol, triethylene glycol, 1,2,6-hexanetriol, thiodiglycol, hexylene glycol, and diethylene glycol; lower alkyl ether acetates such as polyethylene glycol monomethyl ether acetate; glycerine; lower alkyl ethers of polyalcohols, such as ethylene glycol monomethyl (or ethyl)ether, diethylene glycol methyl (or ethyl) ether, or triethylene glycol monomethyl (or ethyl)ether; and N-methyl-2-pyrrolidone, 2-pyrrolidone, and 1,3-dimethyl-2-imidazolidinone. Also, deionized water (ion-exchanged water) is preferably used as the water.

(Pigment)

Carbon black and organic pigments are preferably used as the pigments. The content of pigment in each of the inks (mass percentage) is preferably between 0.1% w/w and 15.0% w/w inclusive with respect to the total mass of the ink.

For the black ink, carbon black such as furnace black, lampblack, acetylene black, or channel black is preferably used. Specifically, potential examples of commercially available products which may be used include: Raven 7000, 5750, 5250, 5000 Ultra, 3500, 2000, 1500, 1250, 1200, 1190 Ultra II, 1170, and 1255 (Columbian); Black Pearls L, Regal 300R, 400R, and 660R, Mogul L, Monarch 700, 800, 880, 900, 1000, 1100, 1300, 1400, and 2000, and Vulcan XC-72R (Cabot); Color Black FW1, FW2, FW2V, FW18, FW200, S150, S160, and S170, Printex 35, U, V, 140U, and 140V, Special Black 6, 5, 4A, and 4 (Degussa); and No. 25, No. 33, No. 40, No. 47, No. 52, No. 900, No. 2300, MCF-88, MA600, MA7, MA8, and MA100 (Mitsubishi Chemical). Carbon black newly prepared for the present invention may also be used. Obviously, the present invention is not limited to the above, and any carbon black of the related art may be used. Furthermore, the present invention is not limited to any carbon black, and substances such as magnetite or ferrite magnetic nanoparticles, and titanium black may also be used as pigment.

Specific examples of organic pigments include: water-insoluble azo pigments such as Toluidine Red, Toluidine Maroon, Hansa Yellow, Benzidine Yellow, and Pyrazolone Red; water-soluble azo pigments such as Lithol Red, Helio Bordeaux, Pigment Scarlet, and Permanent Red 2B; vat dye derivatives such as Alizarin, Indanthrone, and Thioindigo Maroon; phthalocyanine-based pigments such as Phthalocyanine Blue and Phthalocyanine Green; quinacridone-based pigments such as Quinacridone Red and Quinacridone Magenta; perylene-based pigments such as Perylene Red and Perylene Scarlet; isoindolinone-based pigments such as Isoindolinone Yellow and Isoindolinone Orange; imidazolone-based pigments such as Benzimidazolone Yellow, Benzimidazolone Orange, and Benzimidazolone Red; pyranthrone-based pigments such as Pyanthrone Red and Pyranthrone Orange; indigo-based pigments, condensed azo pigments, thioindigo-based pigments, and diketo-pyrrolopyrrole-based pigments; and Flavanthrone Yellow, Acylamido Yellow, Quinoline Yellow, Nickel Azo Yellow, Copper Azomethine Yellow, Perinone Orange, Anthrone Orange, Dianthraquinonyl Red, and Dioxazine Violet. Obviously, the present invention is not limited to the above.

Furthermore, when expressing organic pigments by color index (C.I.) numbers, examples of usable pigments include: C.I. Pigment Yellow 12, 13, 14, 17, 20, 24, 74, 83, 86, 93, 97, 109, 110, 117, 120, 125, 128, 137, 138, 147, 148, 150, 151, 153, 154, 166, 168, 180, and 185; C.I. Pigment Orange 16, 36, 43, 51, 55, 59, 61, and 71; C.I. Pigment Red 9, 48, 49, 52, 53, 57, 97, 122, 123, 149, 168, 175, 176, 177, 180, 192, 215, 216, 217, 220, 223, 224, 226, 227, 228, 238, 240, 254, 255, and 272; C.I. Pigment Violet 19, 23, 29, 30, 37, 40, and 50; C.I. Pigment Blue 15, 15:1, 15:3, 15:4, 15:6, 22, 60, and 64; C.I. Pigment Green 7 and 36; and C.I. Pigment Brown 23, 25, and 26. Obviously, the present invention is not limited to the above.

(Dispersant)

Any water-soluble plastic may be used as a dispersant to disperse pigments such as the above in the aqueous medium. More particularly, the dispersant preferably has a weight-average molecular weight between 1,000 and 30,000 inclusive, and more preferably between 3,000 and 15,000 inclusive. The content of dispersant in each of the inks (mass percentage) is preferably between 0.1% w/w and 5.0% w/w inclusive with respect to the total mass of the ink.

Specifically, potential examples of substances usable as the dispersant include: styrene, vinylnaphthalene, aliphatic alcohol esters of ethylene/$\alpha,\beta$-unsaturated carboxylic acid, acrylic acid, maleic acid, itaconic acid, fumaric acid, vinyl acetate, vinyl pyrolidone, acrylamide, and polymers taking derivatives thereof as monomers. Note that one or more of the monomers constituting a polymer is preferably a hydrophilic monomer, and a block copolymer, random copolymer, graft copolymer, or any of their salts maybe used. Alternatively, a natural resin such as rosin, shellac, or starch may also be used. Such resins are preferably soluble in an aqueous solution with a dissolved base, or in other words, are alkali-soluble.

(Surfactant)

In order to adjust the surface tension of the inks constituting the ink set, it is preferable to use a surfactant such as an anionic surfactant, a non-ionic surfactant, or an amphoteric surfactant. Specifically, substances such as polyoxyethylene alkyl ether, polyoxyethylene alkyl phenols, acetylenic glycol compounds, and acetylenic glycol ethylene oxide adducts may be used.

(Other Components)

Besides the above components, the inks constituting the ink set may also contain moisture-retaining solids such as urea, urea derivatives, trimethylolpropane, and trimethylolethane in order to stay moist. The content of moisture-retaining solids in each of the ink (mass percentage) is preferably between 0.1% w/w and 20.0% w/w inclusive, and more preferably between 3.0% w/w and 10.0% w/w inclusive with respect to the total mass of the ink. In addition, the inks constituting the ink set may also contain various additives other than the above components as necessary, such as pH adjusters, anticorrosive agents, preservatives, mold inhibitors, antioxidants, anti-reduction agents, and evaporation accelerators.

Next, the inks used in the present embodiment will be specifically described. The present invention is not limited by the following embodiment insofar as the principle matter thereof is not exceeded. Note that the terms "parts" and "%" herein are based on mass, unless specifically noted otherwise.

(Preparation of Resin Solution A)

A random copolymer with an acid value of 288 mg KOH/g, a weight-average molecular weight of 10,000, and a monomer composition of styrene/n-butyl acrylate/acrylic acid=23/37/37 was neutralized to 1 equivalent with potassium hydroxide. After that, the solution was adjusted with water to reach a resin concentration of 10.0% and obtain a resin solution A.

(Preparation of Resin Solution B)

A resin solution B was prepared similarly to the preparation of the resin solution A, except that a random copolymer with an acid value of 288 mg KOH/g, a weight-average molecular weight of 10,000, and a monomer composition of styrene/n-butyl acrylate/acrylic acid=23/37/37 was used instead of the styrene/acrylic acid random copolymer with an acid value of 200 mg KOH/g, a weight-average molecular weight of 10,000 that was used in the resin solution A.

(Preparation of Pigment Dispersions 1 to 4)

Pigment dispersions 1 to 4 were prepared according to the procedure indicated below.

<Preparation of Pigment Dispersion 1 Containing C.I. Pigment Red 122>

10 parts pigment (C.I. Pigment Red 122) were mixed with 20 parts resin solution A and 70 parts ion-exchanged water, and dispersed for three hours using a batch-type vertical sand mill. After that, coarse particulate was removed by a centrifugation process. Additionally, the mixture was filtered under pressure through a cellulose acetate filter (Advantec) with a pore size of 3.0 µm to obtain the pigment dispersion 1 with a pigment concentration of 10% w/w.

<Preparation of Pigment Dispersion 2 Containing C.I. Pigment Blue 15:3>

10 parts pigment (C.I. Pigment Blue 15:3) were mixed with 20 parts resin solution A and 70 parts ion-exchanged water, and dispersed for five hours using a batch-type vertical sand mill. After that, coarse particulate was removed by a centrifugation process. Additionally, the mixture was filtered under pressure through a cellulose acetate filter (Advantec) with a pore size of 3.0 µm to obtain the pigment dispersion 2 with a pigment concentration of 10% w/w.

<Preparation of Pigment Dispersion 3 Containing C.I. Pigment Yellow 74>

10 parts pigment (C.I. Pigment Yellow 74) were mixed with 20 parts resin solution A and 70 parts ion-exchanged water, and dispersed for one hour using a batch-type vertical sand mill. After that, coarse particulate was removed by a centrifugation process. Additionally, the mixture was filtered under pressure through a cellulose acetate filter (Advantec) with a pore size of 3.0 µm to obtain the pigment dispersion 3 with a pigment concentration of 10% w/w.

<Preparation of Pigment Dispersion 4 Containing C.I. Pigment Black 7>

10 parts carbon black pigment (C.I. Pigment Black 7) were mixed with 20 parts resin solution A and 70 parts ion-exchanged water, and dispersed for three hours using a batch-type vertical sand mill. Note that the circumferential velocity during the dispersion was twice that during the preparation of the pigment dispersion 1. After that, coarse particulate was removed by a centrifugation process. Additionally, the mixture was filtered under pressure through a cellulose acetate filter (Advantec) with a pore size of 3.0 µm to obtain the pigment dispersion 4 with a pigment concentration of 10% w/w.

(Preparation of Ink)

After mixing and sufficiently stirring the respective components indicated in Table 1, the mixtures were filtered under pressure through a cellulose acetate filter (Advantec) with a pore size of 0.8 µm to prepare the coloring inks 1 to 7 and clear ink.

However, the composition of the clear ink CL is not limited to the above. The clear ink CL may contain a different type of resin or a different amount of added resin insofar as the result is an ink that covers pigment color material remaining on a sheet surface in order to prevent bronzing, and achieves similar effects.

TABLE 1

|  | Ink | | | | | | | |
|---|---|---|---|---|---|---|---|---|
|  | 1 | 2 | 3 | 4 | 5 | 6 | 7 | 8 |
| Pigment dispersion 1 | 40 | 10 |  |  |  |  |  |  |
| 2 |  |  | 40 | 10 |  |  |  |  |
| 3 |  |  |  |  | 40 |  |  |  |
| 4 |  |  |  |  |  | 30 | 10 |  |
| Resin solution B 5 |  |  |  |  |  |  |  | 1 |
| Glycerin | 5.0 | 5.0 | 5.0 | 5.0 | 5.0 | 5.0 | 5.0 | 5.0 |
| Diethylene glycol | 5.0 | 5.0 | 5.0 | 5.0 | 5.0 | 5.0 | 5.0 | 5.0 |
| Polyethylene glycol 1000 | 5.0 | 5.0 | 5.0 | 5.0 | 5.0 | 5.0 | 5.0 | 5.0 |
| Surfynol 465 | 1.0 | 1.0 | 1.0 | 1.0 | 1.0 | 1.0 | 1.0 | 1.0 |
| Ion-exchanged water | 44 | 74 | 44 | 74 | 44 | 54 | 74 | 83 |
| Ink type | M | Lm | C | Lc | Y | K | Gy | CL |

(First Embodiment)

Figure 6:
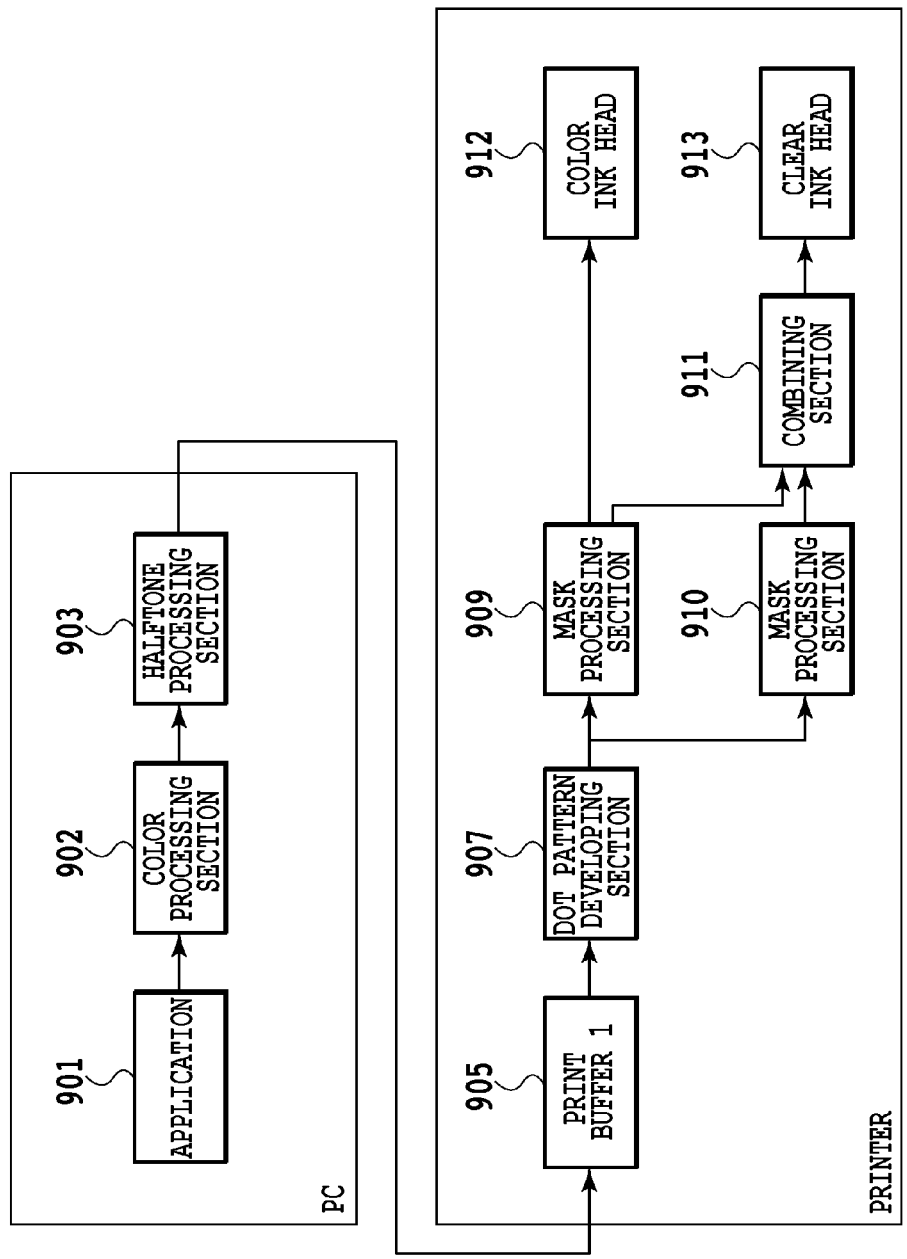
FIG. 6 is a block diagram illustrating an image processing configuration in a printing system made up of an inkjet printing apparatus according to an embodiment of the present invention and a personal computer (PC) that acts as the host device thereof.

FIG. 6 is a block diagram illustrating an image processing configuration in a printing system made up of an inkjet printing apparatus according to an embodiment of the present invention and a personal computer (PC) that acts as the host device thereof. Note that image processing executed by the printing system illustrated in FIG. 6 is realized by control and processing elements in the PC and printer, respectively. Note also that application of the present invention is obviously not limited to this embodiment. For example, the image processing components up to the combining section illustrated in FIG. 6 may be incorporated into the PC, or alternatively, the image processing configuration of the color processing section and thereafter may be incorporated into the printer. In this specification, these image processing components and image processing configurations are also referred as an image processing apparatus.

Image data processed by an application 901 on the PC is input into a color processing section 902 also on the PC as RGB image data with 8 bits per color, for a total of 24 bits. The color processing section 902 uses color conversion tables discussed later with FIG. 15 to convert the RGB image data into image data (ink use amount data) made up of signals for the colors C, M, Y, Lc, Lm, R, PBk, Gy, and MBk of the coloring inks used by the inkjet printing apparatus, as well as a first signal CL1 and a second signal CL2 for clear ink. This conversion determines respective use amounts of the coloring ink and the clear ink. The output signal has 12 bits per color, for a total of a 132-bit signal. With this signal, gradation can be maintained. As discussed later with FIGS. 10 and 11, the clear ink signal CL1 constitutes image data (first use amount data) for ejecting the clear ink onto the same area during the same scan as coloring ink. On the other hand, the signal CL2 constitutes image data (second use amount data) for ejecting the clear ink onto the same area as the above, but during a separate scan after printing with the coloring ink.

The halftone processing section 903 performs a halftoning process such as error diffusion to convert a multi-level input signal with 12 bits per color, or 4096 values, into N-valued data that is less than 4096 values. Specifically, the N value is multi-level, with 2 to 4 bits per color, for approximately 3 to 16 values. Note that although the present embodiment illustrates an example of halftoning that yields multi-level data, the configuration is not limited thereto, and halftoning that yields binary data is also acceptable.

Figure 7:
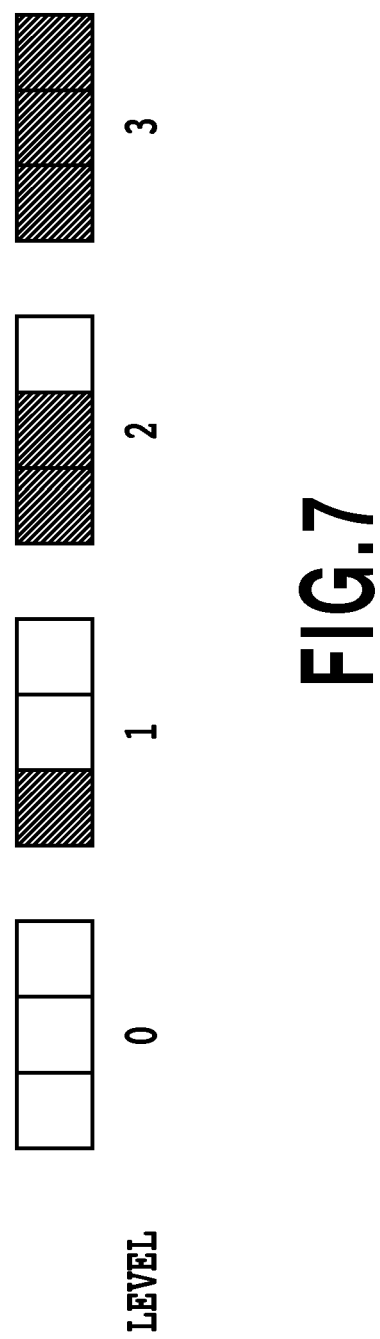
FIG. 7 is a diagram illustrating dot layout patterns for developing dot patterns according to N values.

The halftone-processed, N-valued image data from the PC is forwarded to the inkjet printing apparatus (printer) and stored in a print buffer 905. A dot pattern developing section 907 retrieves the N-valued data stored in the print buffer 905, and develops dot patterns according to the N values. FIG. 7 is a diagram illustrating dot patterns. The example depicted in FIG. 7 illustrates dot patterns for the N=4 case, in which dot patterns of 3 pixels×1 pixel are determined in correspondence with each of the levels 0, 1, 2, and 3 expressed by the 4-valued image data. Each pattern represents binary data, in which pixels shaded by black indicate dots which are ON, while white pixels indicate dots which are OFF. In other words, the dot pattern development yields binary data at triple the resolution in the scan direction. Respective dot patterns corresponding to each signal value (pixel value) are similarly developed for the clear ink image data CL1 and CL2, yielding binary data for each.

Next, the mask processing sections 909 and 910 split the binary data for each ink obtained by the dot pattern developing section 907 into data corresponding to multiple scans by the print head over the same printing area. This process is conducted using thinning patterns (hereinafter also referred to as mask patterns). The mask processing section 909 performs mask processes to the data for the coloring inks C, M, Y, Lc, Lm, R, PBk, MBk, and Gy as well as the clear ink data CL1, while the mask processing section 910 performs mask processes to the clear ink data CL2, thus generating respective print data.

Figure 8:
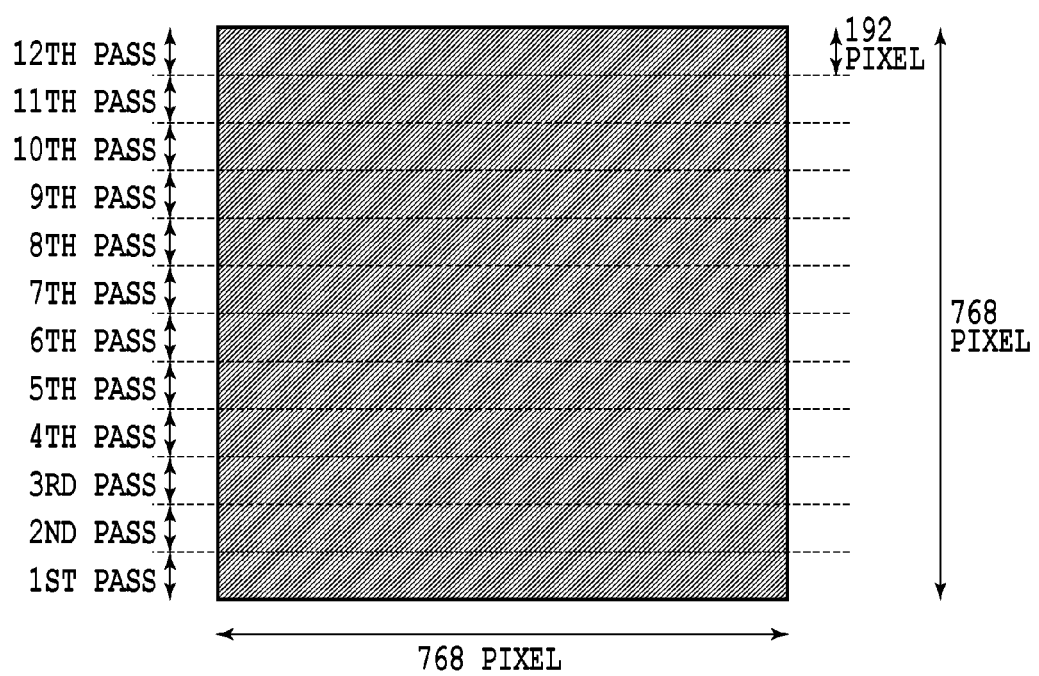
FIG. 8 is a diagram illustrating a typical mask pattern for comparison with a mask pattern of the present embodiment.
Figure 9:
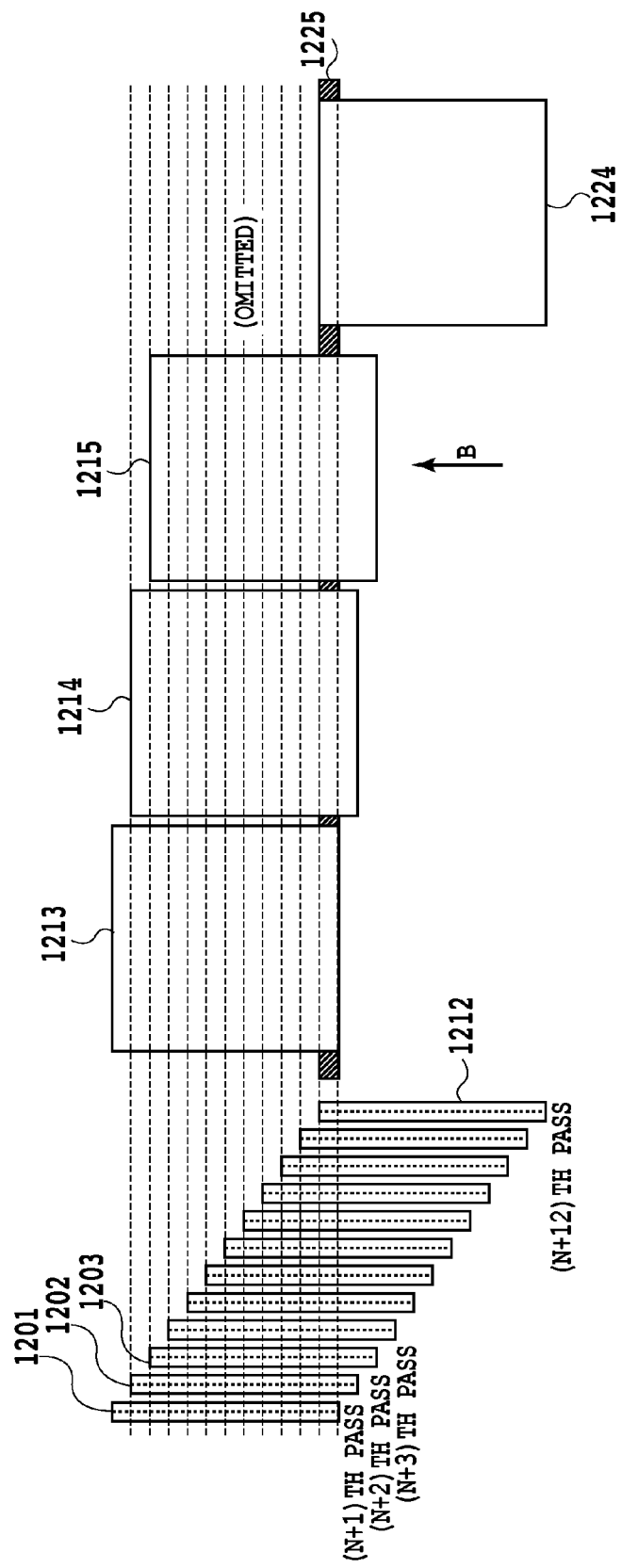
FIG. 9 is a diagram illustrating multi-pass printing using the mask pattern illustrated in FIG. 8.

FIG. 8 is a diagram illustrating a typical mask pattern for comparison with a mask pattern of the present embodiment. The mask pattern illustrated in FIG. 8 is a mask pattern for 12-pass multi-pass printing, which completes the printing of the same unit area in 12 scans. In this mask pattern, pixels turned ON in a particular pass are represented with black dots while pixels turned OFF are represented with white dots, with the dot layout being determined randomly (such a layout is depicted using gray or hatching in FIG. 8 and subsequent drawings). The vertical-by-horizontal pixel size is 768 pixels by 768 pixels, with the vertical direction corresponding to a nozzle array direction in the print head, and the horizontal direction corresponding to the main scan direction in which the print head scans. Also, the vertical pixel size of 768 corresponds to the 768 nozzles in the print head. As illustrated by broken lines in FIG. 8, dividing the vertical 768 pixels into 12 sections yield divided mask areas (1st pass to 12th pass) having a vertical height of 64 pixels, which correspond to the unit areas whose printing is completed in the above 12 scans. Each of these unit areas are successively printed by varying the nozzles used, on the basis of print data masked by the mask patterns for 1st pass to 12th pass. Furthermore, these mask patterns for 1st pass to 12th pass are mutually complementary. The mask patterns for 1st pass to 12th pass in this example have nearly the same duty, or in other words, a duty of approximately 8.3%. FIG. 9 is a diagram illustrating multi-pass printing using the mask pattern illustrated in FIG. 8. In FIG. 9, reference numerals 1201 to 1212 indicate the relative positions of the print head (in FIG. 9, the print head is illustrated for only one color for simplicity) to the printing sheet, and reference numeral 1213 to 1225 indicate a single mask pattern associated with a nozzle array in the print head. Note that these mask patterns, although given different reference numerals, represent the same single mask pattern, and illustrate how the position of the corresponding mask pattern also moves together with the above relative movement of the print head. In other words, FIG. 9 illustrates how the divided mask areas of a mask pattern and divided nozzle groups are associated with the unit area 1225, whose printing on the printing sheet is completed as the printing sheet is successively conveyed while conducting 12-pass multi-pass printing. Note that whereas FIG. 9 illustrates the print head and the mask pattern as moving relative to the printing sheet, in actuality the position of the printing sheet moves as the printing sheet is conveyed.

As illustrated in FIG. 9, a scan by the print head (position) 1201 is conducted during the scan of (N+1)-th pass. At this point, the unit area 1225 is printed on the basis of print data generated by the lowermost mask area of the mask pattern 1213, using the lowermost nozzle group from among the nozzle groups obtained by dividing the nozzles on the nozzle array into 12 sections. Next, the printing sheet is conveyed a distance equivalent to the width of the above unit area in the direction of the arrow B in FIG. 9. Then, a scan by the print head (position) 1202 is conducted during the scan of the next (N+2)-th pass, and the unit area 1225 is printed on the basis of print data generated by the second from lowermost mask area of the mask pattern 1214, using the second from lowermost nozzle group from among the nozzle groups. At this point, a separate unit area neighboring the unit area 1225 is also printed on the basis of print data generated by the lowermost neighboring mask area, using the lowermost neighboring nozzle group. Similarly, the printing sheet is conveyed and the print head scans, until a scan by the print head (position) 1212 is conducted during the scan of the (N+12)-th pass, and the unit area 1225 is printed on the basis of print data generated by the twelfth from the lowermost mask area of the mask pattern 1224, using the twelfth from the lowermost (or in other words the uppermost) nozzle group from among the nozzle groups. At this point, the printing of the unit area 1225 is completed.

Figure 10:
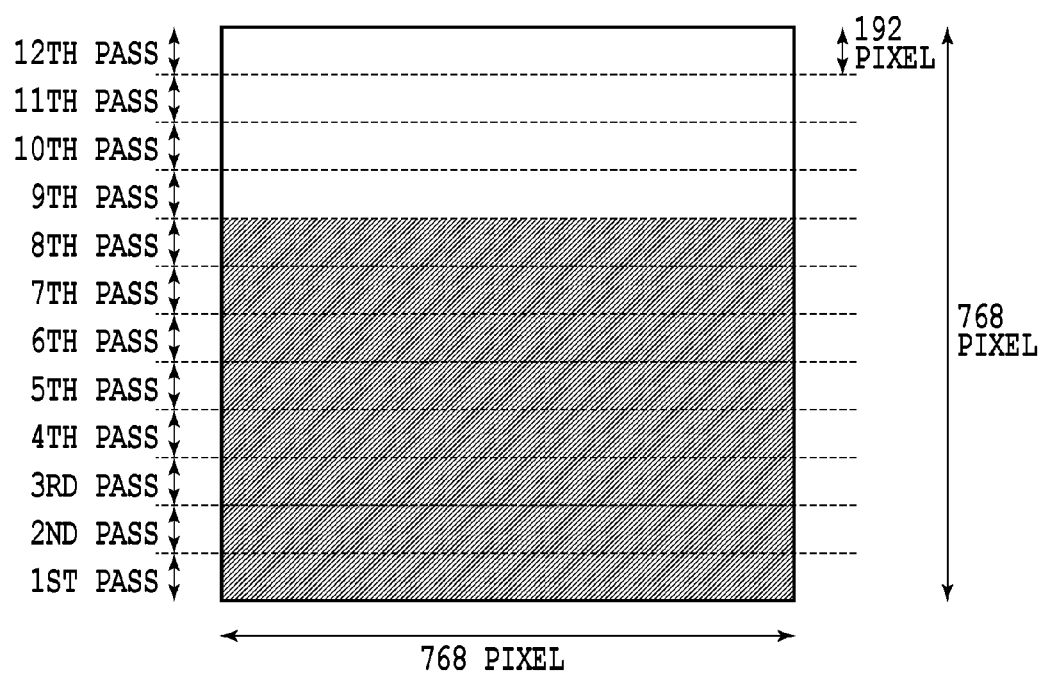
FIG. 10 is a diagram illustrating a mask pattern according to the present embodiment used by a mask processing section 909.

FIG. 10 is a diagram illustrating a mask pattern according to the present embodiment used by the mask processing section 909, which performs mask processes to the coloring ink data and the clear ink data CL1. Unlike the typical mask pattern illustrated in FIG. 8, the black ON dots (and the white OFF dots) exist only in the divided mask areas corresponding to 1st pass to 8th pass, with no ON dots in the divided mask areas corresponding to 9th pass to 12th pass. That is, when using this mask, the printing of a unit area is completed in the eight passes from 1st to $8^{th}$ pass.

Figure 11:
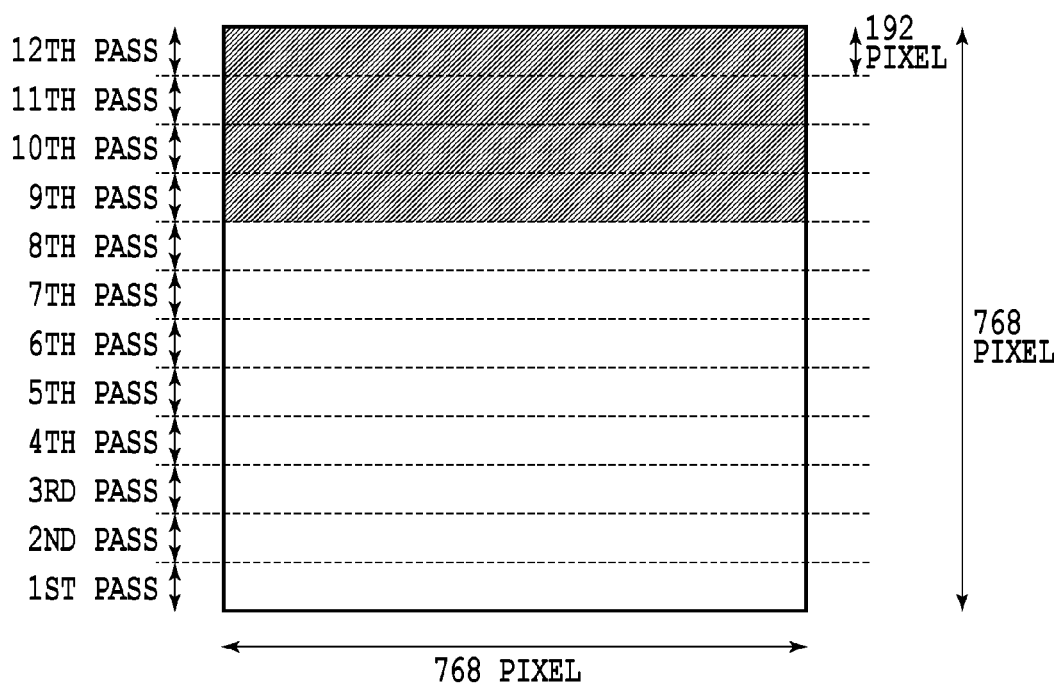
FIG. 11 is a diagram illustrating a mask pattern according to the present embodiment used by a mask processing section 910.

On the other hand, FIG. 11 is a diagram illustrating a mask pattern according to the present embodiment used by the mask processing section 910, which performs mask processes to the clear ink data CL2. As illustrated in FIG. 11, unlike the mask pattern used for the coloring ink and the clear ink data CL1 illustrated in FIG. 10, ON dots exist only in the divided mask areas corresponding to 9th pass to 12th pass, with no ON dots in the divided mask areas corresponding to 1st pass to 8th pass.

Figure 12:
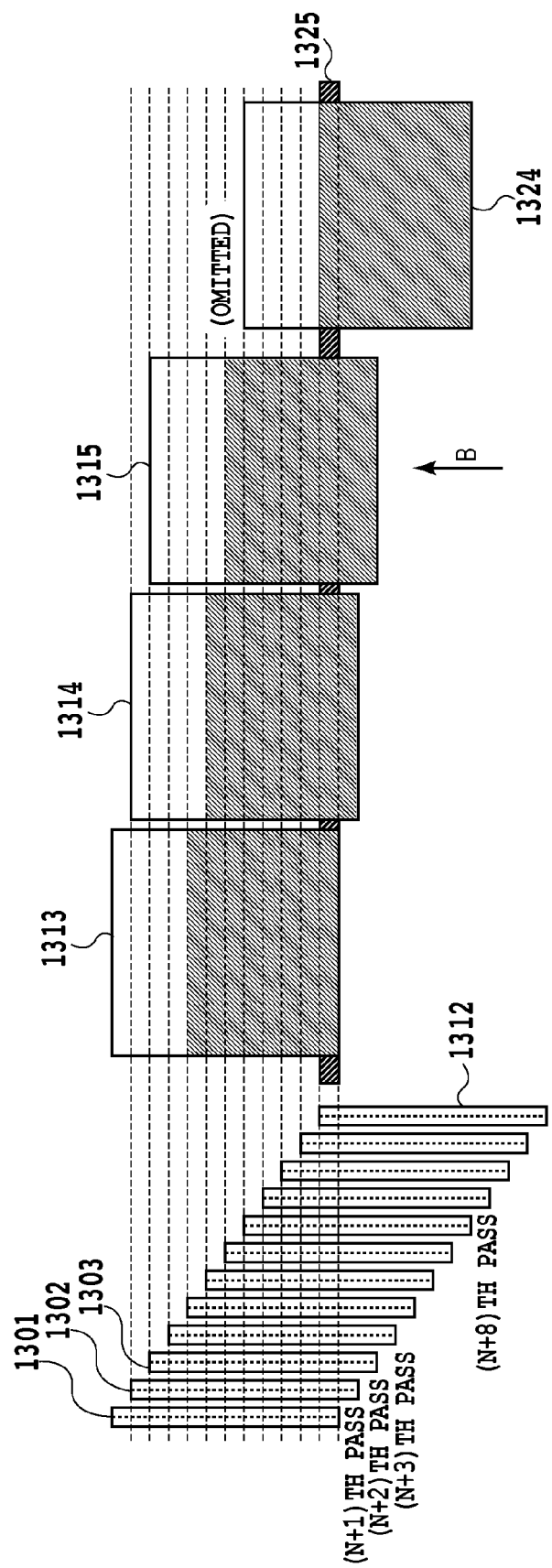
FIG. 12 is a diagram illustrating how the mask pattern illustrated in FIG. 10 is used by the mask processing section 909 in multi-pass printing.
Figure 13:
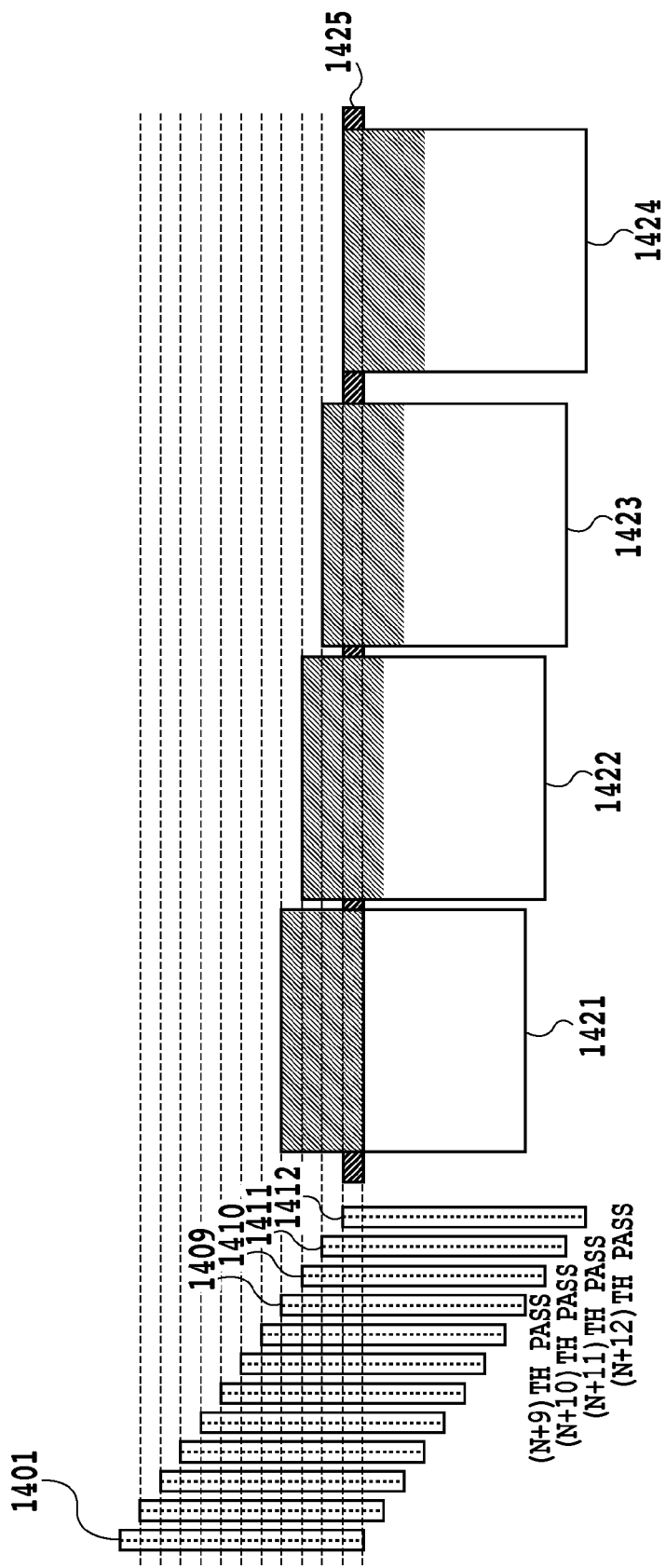
FIG. 13 is a diagram illustrating how the mask pattern illustrated in FIG. 11 is used by the mask processing section 910 in multi-pass printing, and generally illustrating how multi-pass printing is conducted.

FIGS. 12 and 13 are diagrams respectively illustrating how the mask pattern illustrated in FIG. 10, which is used by the mask processing section 909, and the mask pattern illustrated in FIG. 11, which is used by the mask processing section 910, are used in multi-pass printing. These drawings are similar to FIG. 9.

Reference numerals 1301 to 1312 in FIG. 12 and reference numerals 1401 to 1412 in FIG. 13 indicate the print head (the print head is illustrated for only one color, similarly to FIG. 9). Also, reference numerals 1313 to 1324 in FIG. 12 and reference 1421 to 1424 in FIG. 13 indicate a single mask pattern associated with a nozzle array in the print head, similarly to FIG. 9.

As illustrated in FIG. 12, the divided mask areas (1st pass to 8th pass) illustrated in FIG. 10 are used during the scans of (N+1)-th pass to (N+8)-th pass to print the unit area 1325 on the basis of print data generated thereby. When this 8-pass printing finishes, next, as illustrated in FIG. 13, the divided mask areas (9th pass to 12th pass) illustrated in FIG. 11 are used during the scans of (N+9)-th pass to (N+12)-th pass to print the unit area 1425 (the same area as the area 1325) on the basis of print data generated thereby.

As a result, 8-pass printing based on the clear ink data CL1 and the coloring ink data is first conducted on the unit area (1325, 1425). After the 8-pass printing based on the clear ink data CL1 and the coloring ink data, 4-pass printing is conducted on the basis of the clear ink data CL2 in separate passes.

Referring again to FIG. 6, after generating the binary data for the clear ink and the coloring ink using the respective mask patterns of the mask processing sections 909 and 910 as described above, the combining section 911 combines the clear ink data CL1 and CL2. Since the 12 divided mask areas have mutually exclusive arrangements of ON dots in a mask pattern obtained by combining the mask patterns illustrated in FIGS. 10 and 11, the combining process takes the logical sum of the respective data. The clear ink data combined by the combining section 911 is sent to the clear ink print head (nozzle array) 913, and the print head is driven and clear ink is ejected on the basis thereof.

Figure 14:
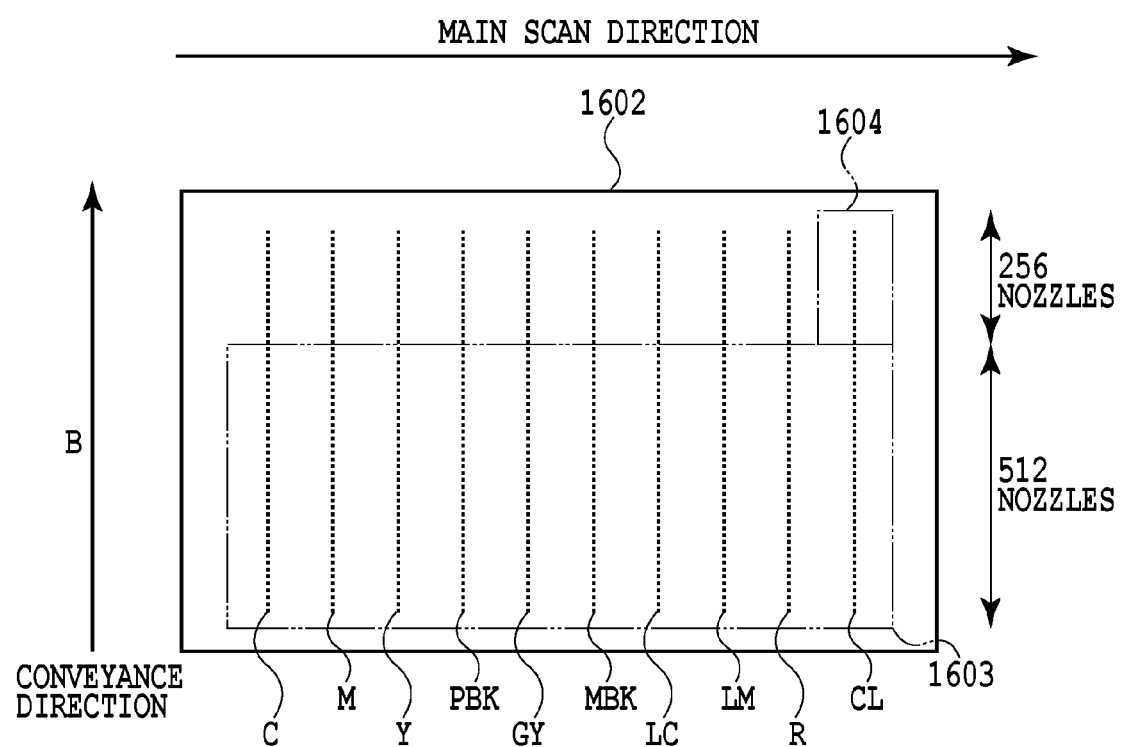
FIG. 14 is a diagram primarily illustrating nozzle arrays that respectively eject nine colors of ink and clear ink in a print head according to the present embodiment.

FIG. 14 is a diagram primarily illustrating nozzle arrays that respectively eject the nine color inks and one clear ink in the print head according to the present embodiment. As illustrated in FIG. 14, on the print head 1602, the nozzle usage range 1603 is the lower 512 nozzles corresponding to the mask pattern illustrated in FIG. 10, while the nozzle usage range 1604 corresponding to the mask pattern illustrated in FIG. 11 is the upper 256 nozzles for clear ink. With this configuration, since a print medium is conveyed in the direction of the arrow B illustrated in FIG. 14, printing by the nozzle usage range 1603 is conducted during the earlier scans, while printing by the nozzle usage range 1604 is conducted during the later scans.

Also, since printing is conducted with scans in both directions during printing operations, printing is conducted with scans proceeding from left to right as well as with scans proceeding from right to left as viewed in FIG. 14. For this reason, in these respective scans, the clear ink is ejected onto the same area before and after the coloring ink, respectively.

Note that the user is able to select multiple printing modes in the application 901 (FIG. 6). In the present embodiment, a color mode (first printing mode) and a monochrome photo mode (second printing mode) are selectable.

Furthermore, the color processing section 902 (FIG. 6) sets the amount of each ink to use with respect to the RGB values of input image data depending on which printing mode has been selected and set. At this point, respective use amounts are also set for the data CL1 for clear ink applied to the print medium during the same scan as coloring ink, and for the data CL2 for clear ink applied to the print medium during a separate scan after printing with the coloring ink.

Figure 15A:
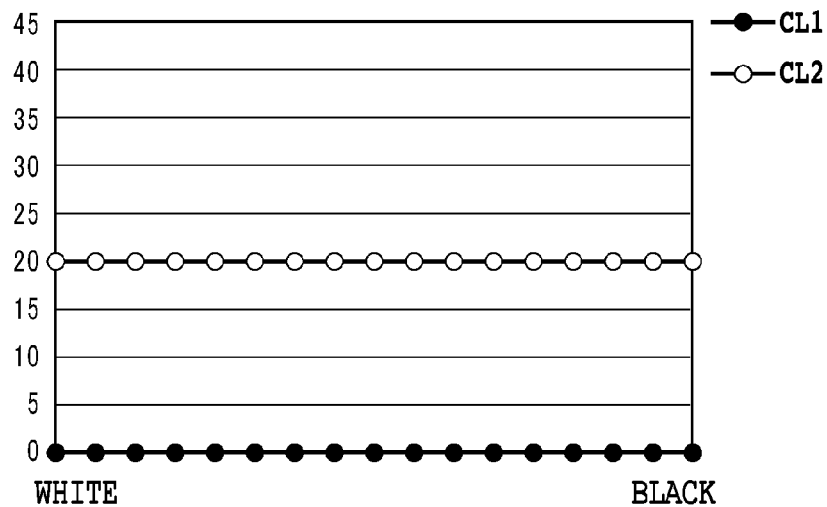
FIGS. 15A and 15B are diagrams illustrating clear ink color conversion tables, used by a color processing section 902, which respectively correspond to a color mode and a monochrome photo mode.
Figure 15B:
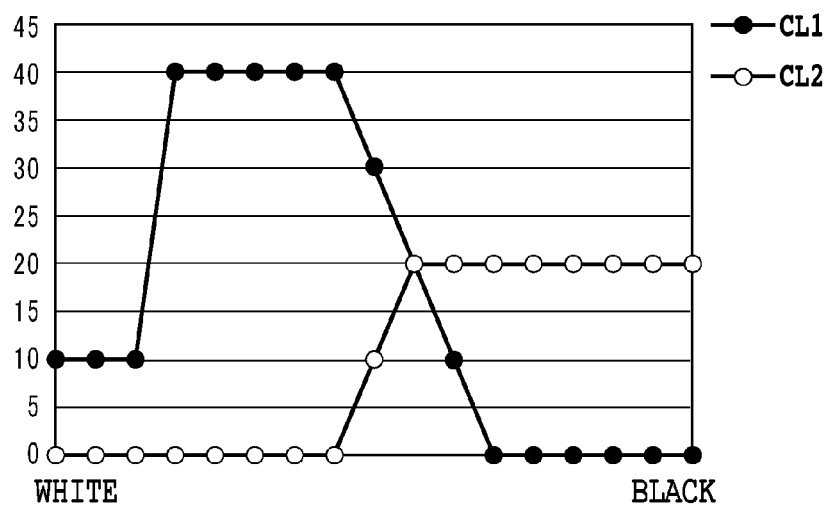

FIGS. 15A and 15B are diagrams illustrating the color conversion tables, used by the color processing section 902, which respectively correspond to the color mode and the monochrome photo mode. Specifically, FIGS. 15A and 15B show the ink use amounts (ink use amounts) indicated by the clear ink data CL1 and the clear ink data CL2 for individual RGB values among the above tables, with respect to a gray line leading from a white point with an RGB value of (255, 255, 255) to a black point with a value of (0, 0, 0) in the input image data.

FIG. 15A shows the ink use amounts respectively indicated by the data CL1 and the data CL2 for a gray line in the color mode. As FIG. 15A demonstrates, the data CL2 only is used at a uniform amount of 20%, while the use amount of the data CL1 is zero.

On the other hand, FIG. 15B shows the ink use amounts of the data CL1 and CL2 for a gray line in the monochrome photo mode. As FIG. 15B demonstrates, the data CL1 indicates a usage of 10% to 40% near the white point, but starting at the intermediate gradation the data CL1 use amount decreases while the data CL2 use amount increases, with a data CL2 use amount of 20% near the black point. Note that in the present embodiment, 100% is taken to be the amount of ink equivalent to applying eight dots of 4 pl ink droplet to a pixel at 600 dpi resolution.

By setting such clear ink use amounts, it is possible to sufficiently suppress bronzing in the color mode where coloring ink data exists, without imparting a particularly strong unnatural look except for specific colors. On the other hand, in the monochrome photo mode where coloring ink data does not exist, it is possible to suppress bronzing to a high level, at the cost of a slight reduction in the glossiness of the printed material. A more detailed description is given below.

Figure 16A:
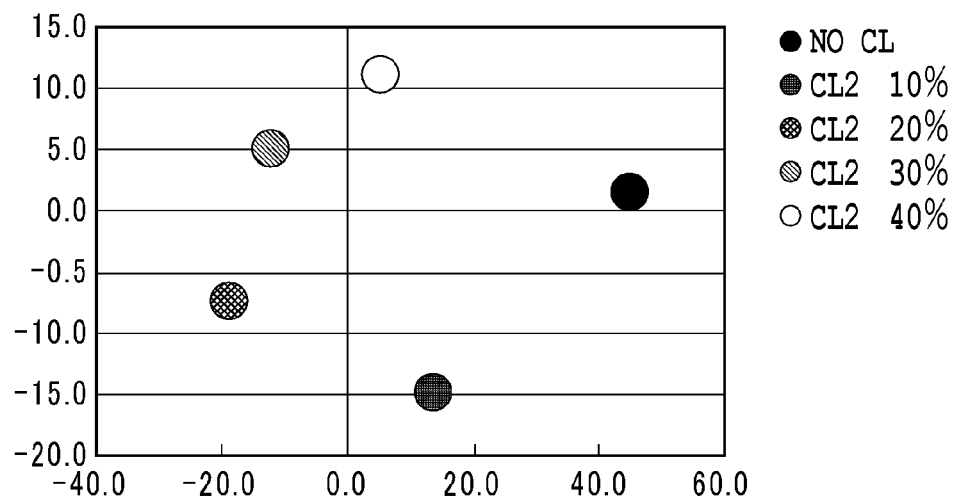
FIGS. 16A and 16B are diagrams illustrating how bronzing color changes in the case of printing by respectively changing the rates of clear ink data CL2 and CL1 with respect to the primary color cyan, for which bronzing is most noticeable in the color mode.
Figure 16B:
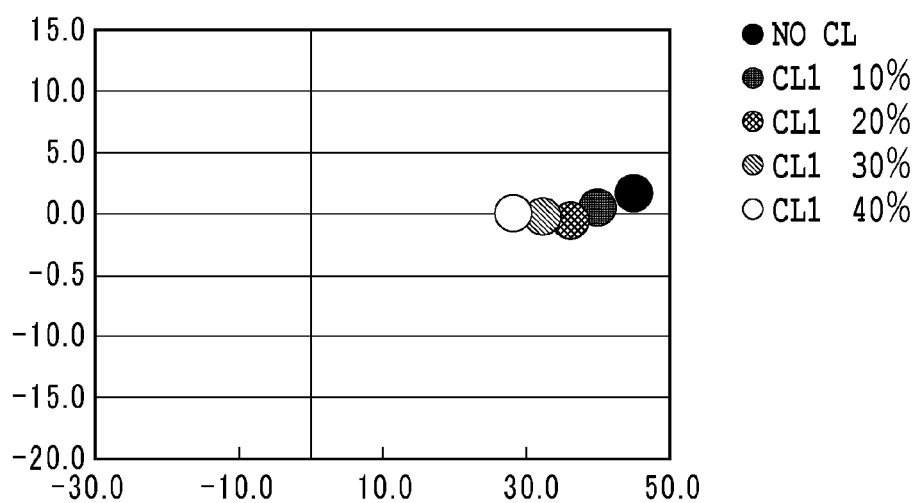

FIGS. 16A and 16B are diagrams illustrating how bronzing color changes in the case of printing by respectively changing the amounts of clear ink data CL2 and CL1 with respect to the primary (maximum saturation) color cyan, for which bronzing is most noticeable in the color mode. In FIGS. 16A and 16B, the horizontal axis represents the $a^*$ value of the bronzing color, while the vertical axis represents the $b^*$ value of the bronzing color.

As illustrated in FIG. 16A, in the case of not using the clear ink, the value of $(a^*, b^*)$ is (44, 2). The bronzing color, having a comparatively strong red tint that differs greatly from the tint of the primary color cyan, provides a strong feeling of strangeness. Increasing the ink amount of the data CL2 in 10% increments causes the bronzing color to change hue from red, to blue, to green, to yellow, rotating clockwise in FIG. 16A. This means that light interference occurs by forming a layer of the clear ink on a top of the layer of the cyan ink, as discussed earlier with FIGS. 2A to 2D, and thus the strength or weakness of the light interference can be controlled by increasing or decreasing the clear ink application amount, and the hue of the specular light can be controlled as a result.

Figure 23A:
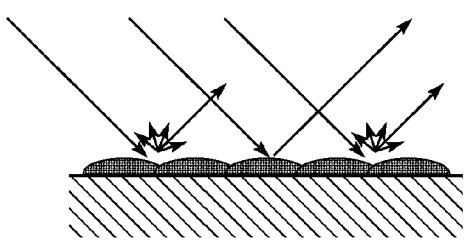
FIGS. 23A to 23C are schematic diagrams illustrating states of bronzing and diffuse reflection.
Figure 23B:
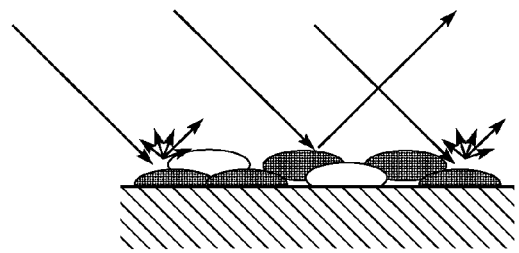
Figure 23C:
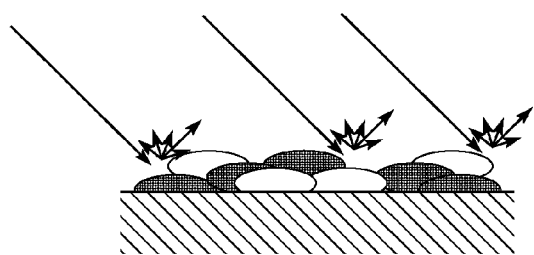

On the other hand, as illustrated in FIG. 16B, in the case of changing the amount of the clear ink data CL1 with respect to the primary color cyan, increasing the ink amount of CL1 up to 40% provides almost no variation in hue, with only a decrease in the $a^*$ value. Since the ink by the data CL1 is applied during the same scan as the coloring ink, a layer of the clear ink cannot be formed on the top of the ink layer as illustrated in FIGS. 2A to 2D, and thus increasing the ink amount of the data CL1 does not provide a corresponding change of hue. In contrast, as described below with reference to FIGS. 23A to 23C, it is possible to comparatively reduce the actual perception of bronzing by producing diffuse reflection. More specifically, in the case of printing with a clear ink amount of 0%, or in other words using the cyan ink only, the outermost surface of the ink is uniform, and thus there is little diffuse reflection of light at the ink surface, as illustrated in FIG. 23A. In contrast, increasing the amount of the clear ink by the data CL1 applied during the same scan as the coloring ink gradually increases the irregularity of the outermost surface of the ink, increasing the diffuse reflection of light at the outermost surface, as illustrated in FIGS. 23B and 23C. Furthermore, since the specular light component equivalently decreases as the diffuse reflection of light increases, the bronzing produced by the coloration of specular light weakens.

Note that the ideal method of reducing the feeling of strangeness due to bronzing would be to make the $(a^*, b^*)$ value of the bronzing color a value close to (0, 0). However, for a image with chromatic color such as the primary color cyan, the feeling of strangeness due to bronzing can be decreased if the bronzing color has a hue close to that color. Thus, it is possible to greatly reduce the feeling of strangeness from bronzing by setting the amount of the data CL2 to approximately 20% as illustrated in FIG. 15A, particularly for the primary color cyan for which bronzing provides a comparatively strong feeling of strangeness.

In addition, FIGS. 17A to 17E and FIGS. 18A to 18E are diagrams illustrating how bronzing changes according to how the use amounts of the clear ink data CL2 and CL1 are respectively changed on a gray line from white to black, in the color mode.

Figure 17A:
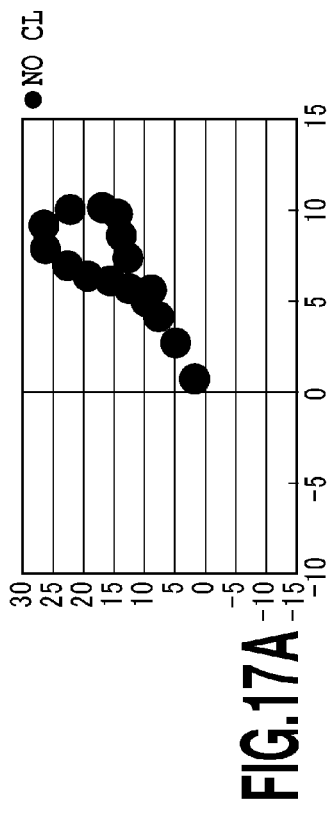
FIGS. 17A to 17E are diagrams illustrating how bronzing changes according to how the use amount of the clear ink data CL2 is respectively modified for gray lines from white to black in the color mode.
Figure 17B:
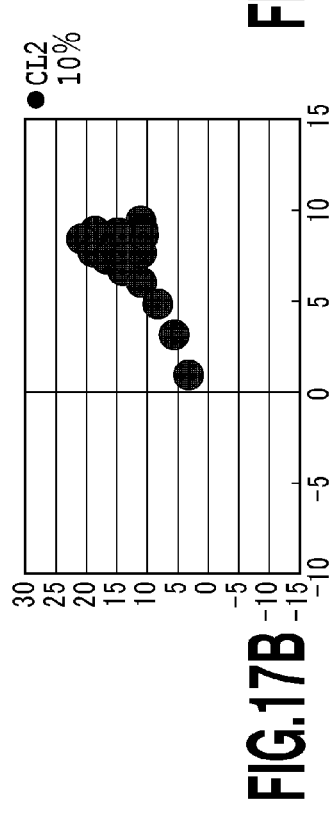
Figure 17C:
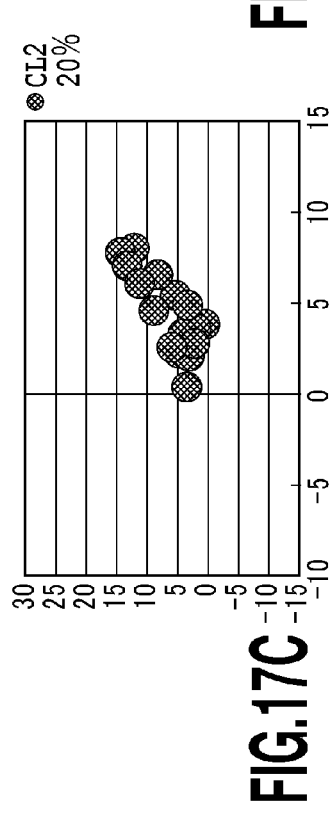
Figure 17D:
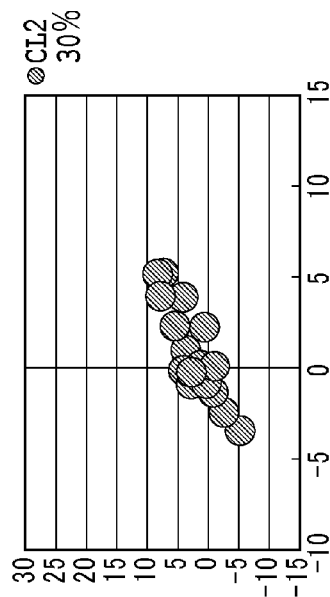
Figure 17E:
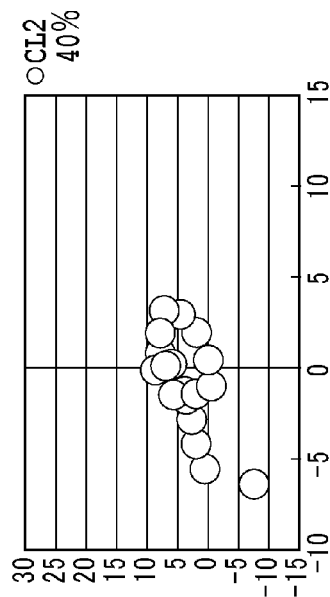
Figure 18A:
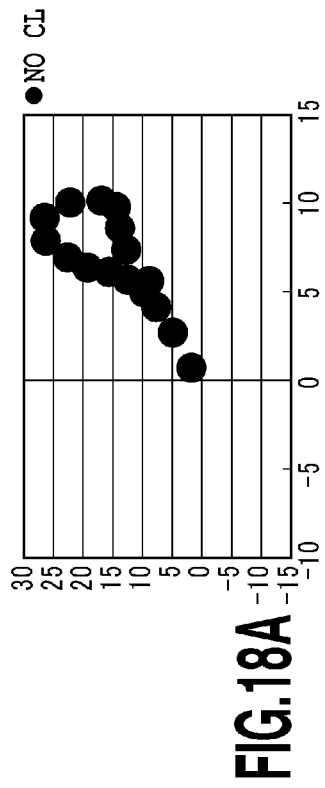
FIGS. 18A to 18E are diagrams illustrating how bronzing changes according to how the use amount of the clear ink data CL1 is respectively modified for gray lines from white to black in the color mode.
Figure 18B:
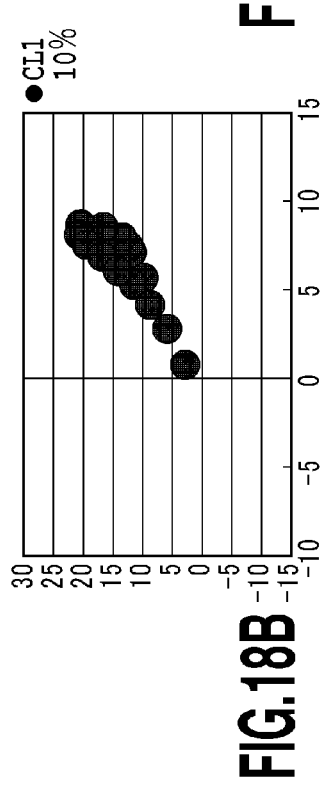
Figure 18D:
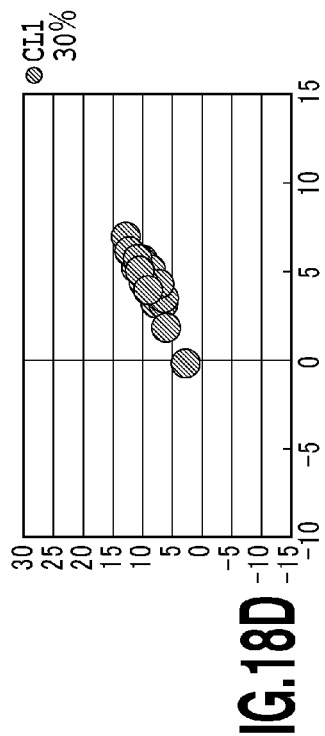
Figure 18C:
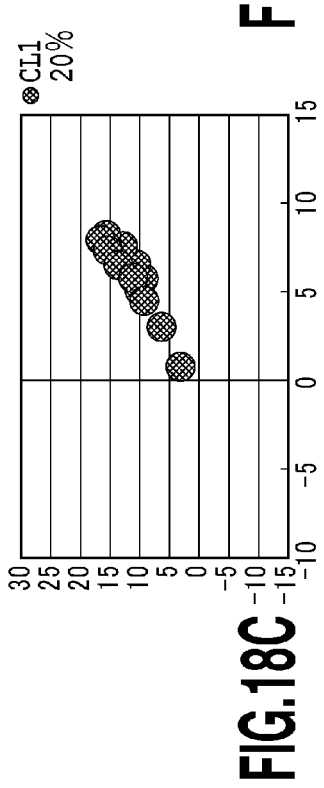
Figure 18E:
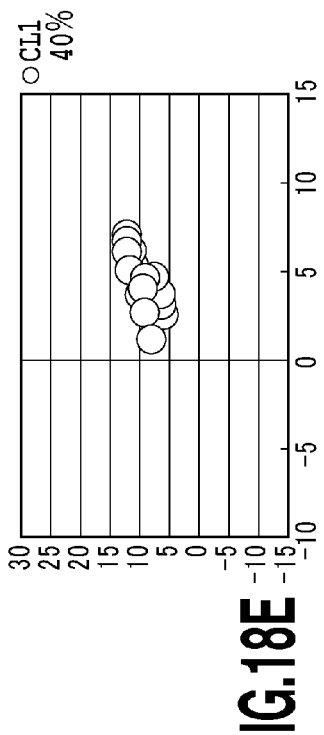

FIGS. 17A to 17E show the bronzing colors of the 17 colors from white to black indicated by the horizontal axis of FIG. 15A, and the change in those bronzing colors as the amount of the data CL2 is increased in 10% increments. In FIGS. 17A to 17E, the horizontal axis represents the a* value of the bronzing color, while the vertical axis represents the b* value of the bronzing color. Increasing the ink amount of the data CL2 causes the bronzing colors to change their overall hue from red-yellow to blue-green. Furthermore, in this case, the (a*, b*) value approaches (0, 0) as a whole when the CL2 ink amount is 20%, as illustrated in FIG. 17C. on the other hand, FIGS. 18A to 18E likewise show the bronzing colors of the 17 gradations (colors) from white to black indicated by the horizontal axis of FIG. 15B, and the change in those bronzing colors as the amount of the data CL1 is increased in 10% increments. Although increasing the amount of the data CL1 in 10% increments hardly changes the bronzing hues, the (a*, b*) value approaches (0, 0) as a whole. This is because increasing the irregularity of the outermost surface of the ink layer with the clear ink by the data CL1 applied during the same scan as the coloring ink cases diffuse reflection and reduces the specular light component, similarly to the case of the primary color cyan discussed earlier. From these additional results in FIGS. 17A to 17E and FIGS. 18A to 18E above, the amount of the data CL2 used in the color mode is set at 20% (FIG. 15A).

Figure 19:
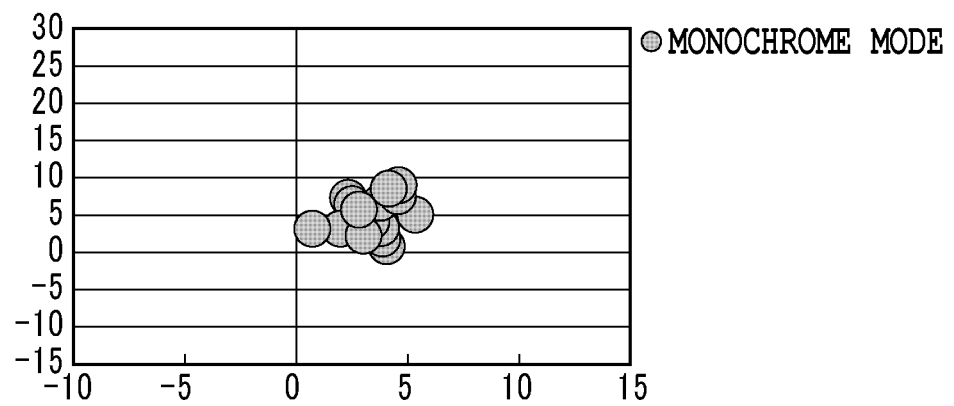
FIG. 19 is a diagram expressing the bronzing colors for the 17 colors from white to black indicated by the horizontal axis in FIG. 15B, which are obtained when setting the rates of the data CL1 and CL2 to the values indicated by the vertical axis in FIG. 15B.

FIG. 19 is a diagram regarding the monochrome photo mode, and shows the bronzing colors for the 17 gradations from white to black indicated by the horizontal axis in FIG. 15B, which are obtained when setting the amounts of the data CL1 and CL2 to the values indicated by the vertical axis in FIG. 15B. In other words, by setting the contents of the color conversion table used by the color processing section 902 in the monochrome photo mode to those illustrated in FIG. 15B, there is little variation in the bronzing colors, and in addition, the (a*, b*) values of the bronzing colors become close to (0, 0) as a whole, as illustrated in FIG. 19. Thus, in the monochrome photo mode, not only is it possible to control the hues of bronzing color, but it is also possible to reduce the actual perception of bronzing and favorably suppress bronzing.

Figure 20A:
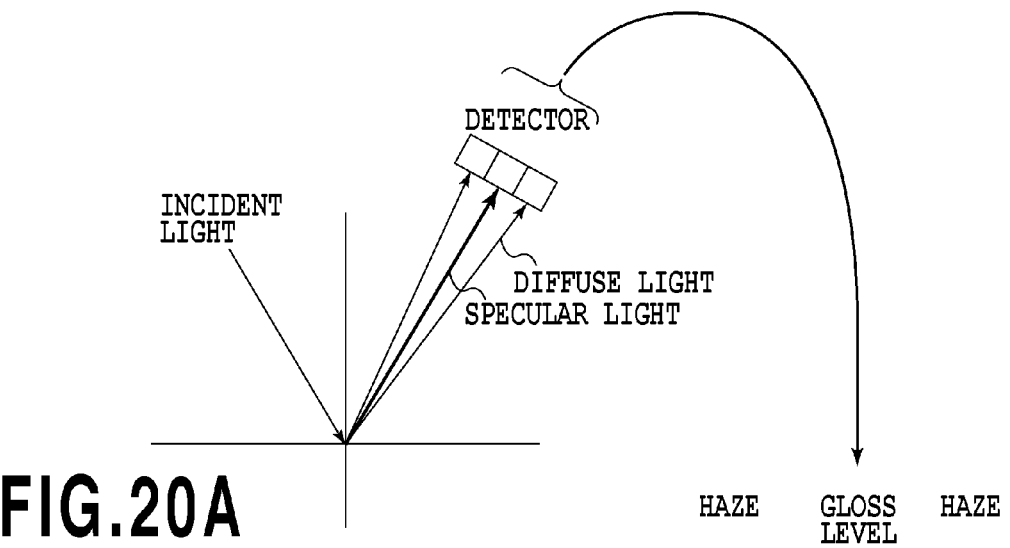
FIGS. 20A to 20D are schematic diagrams illustrating a gloss measuring device.

The foregoing describes the effects of bronzing suppression by increasing or decreasing the ink rates of the data CL1 and CL2. Increasing or decreasing the ink amounts of the data CL1 and CL2 also changes glossiness. Gloss feeling typically may be divided into glossiness and haze. Hereinafter, gloss and haze will be explained using FIGS. 20A to 20D. As illustrated in FIG. 20A, values for the 20° mirror plane gloss (hereinafter designated gloss) and haze may be computed by detecting the reflected light reflected off a printed material surface with a detector (for example, the B-4632 from BYK-Gardner, Japanese product name Micro-Haze Plus). The reflected light is distributed over some angle centered about the axis of its specular light. As illustrated in FIG. 20D, the gloss may be detected through an aperture width of 1.8° at the detector center, for example, while the haze is detected over a range of ±2.7° farther outward, for example. In other words, when observing reflected light, the gloss is defined to be the reflection ratio of specular light constituting the central axis of the distribution versus the incident light. Meanwhile, the haze or haze value is defined to be the measurement of diffuse light produced near the specular light in the distribution of the reflected light. Note that the gloss and the haze measured by the above detector have dimensionless units, with the gloss conforming to JIS K5600 and the haze conforming to ISO/DIS 13803.

Image clarity may be measured using JIS H8686 (Test Methods for Image Clarity of Anodic Oxide Coatings on Aluminum and Aluminum Alloys) or JIS K7105 (Testing Methods for Optical Properties of Plastics), for example, and expresses the sharpness of an image appearing on a print medium. For example, the image clarity value decreases in the case where an illuminated image appearing on a print medium is blurry. The Image Clarity Meter ICM-1T (Suga Test Instruments) and the Image Clarity Measuring Device GP-1S (Optec) are commercially available devices for measuring image clarity that conform to JIS standards.

Figure 20B:
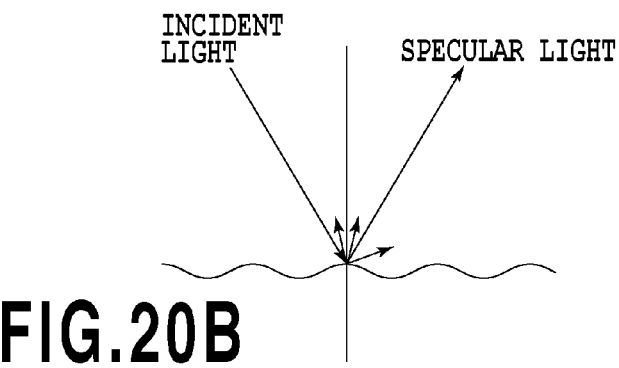
Figure 20C:
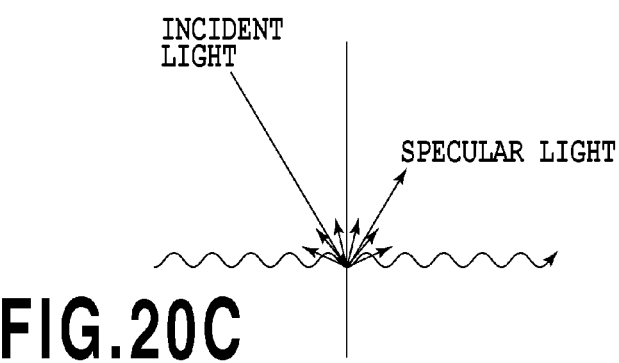
Figure 20D:
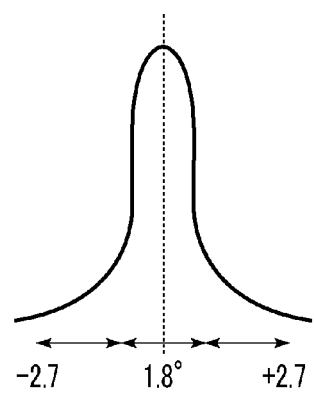

FIGS. 20B and 20C are diagrams illustrating how the magnitude and direction of reflected light change depending on the surface roughness of the printed image. As FIGS. 20B and 20C demonstrate, typically the reflected light scatters and the amount of specular light decreases as the surface becomes rougher, and thus smaller values are measured for image clarity and glossiness.

Figure 21A:
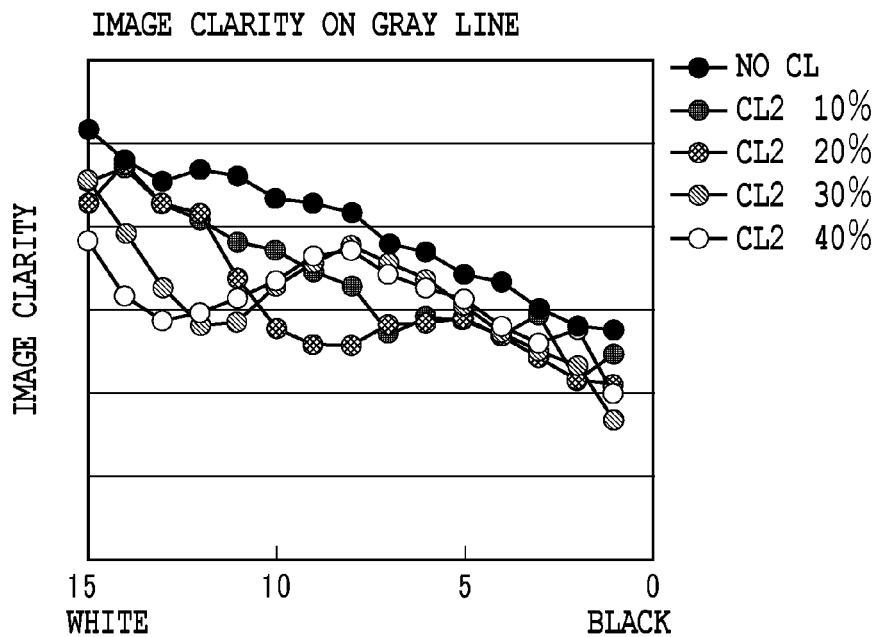
FIGS. 21A and 21B are diagrams illustrating respective changes in image clarity corresponding to changes in the rates of the data CL1 and CL2.
Figure 21B:
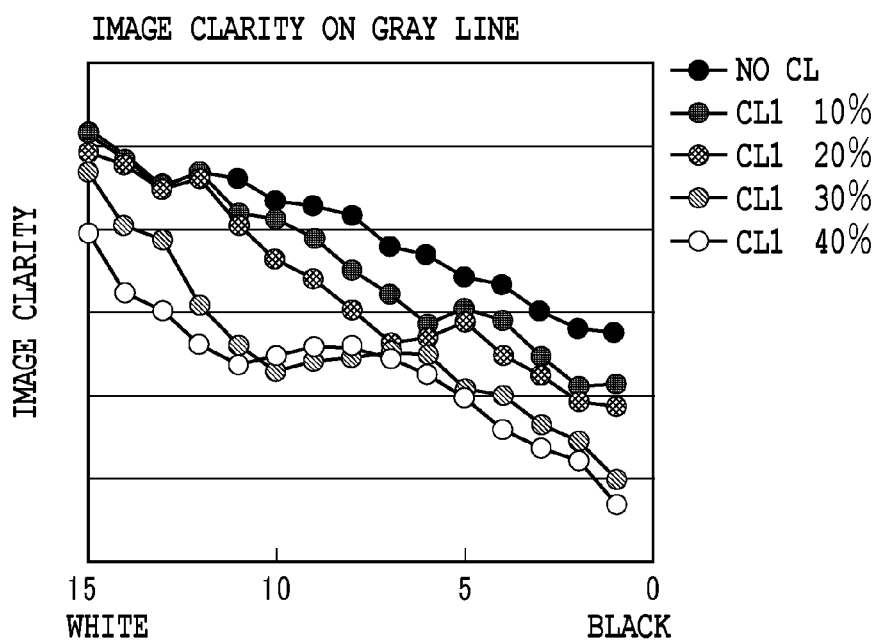

Printing results with respect to image clarity in particular differ in the case of varying the amounts of the data CL1 and CL2 as in the present embodiment. FIGS. 21A and 21B are diagrams illustrating respective changes in image clarity corresponding to changes in the amounts of the data CL1 and CL2. FIG. 21A illustrates the results of measuring image clarity for a gray line leading from a white point to a black point while varying the amount of the data CL2 in 10% increments. Also, FIG. 21B illustrates the results of measuring while varying the amount of the data CL1. Image clarity tends to decrease in both the case of increasing the amount of the data CL1 and the case of increasing the data CL2, and this tendency is particularly strong in the case of increasing the data CL1. For example, although high image clarity is preferable for printing photo images, investigation by the present inventors demonstrates that when bronzing and image clarity is considered, it is better take a balanced approach that prioritizes bronzing suppression in the monochrome mode to account for the strength of the feeling of strangeness that bronzing provides to the monochrome printing, while prioritizing image clarity in the color mode.

As described in the foregoing, by setting the ink amounts of the data CL1 and CL2 as in FIGS. 15A and 15B in the color mode and monochrome mode, the (a*, b*) value can be reduced compared to the case of not using the clear ink for bronzing on a gray line in the color mode, as illustrated in FIG. 17C. Also, the (a*, b*) value can be brought close to (0, 0) for bronzing on a gray line in the monochrome mode, enabling printing that is even less feeling of strangeness.

Figure 22A:
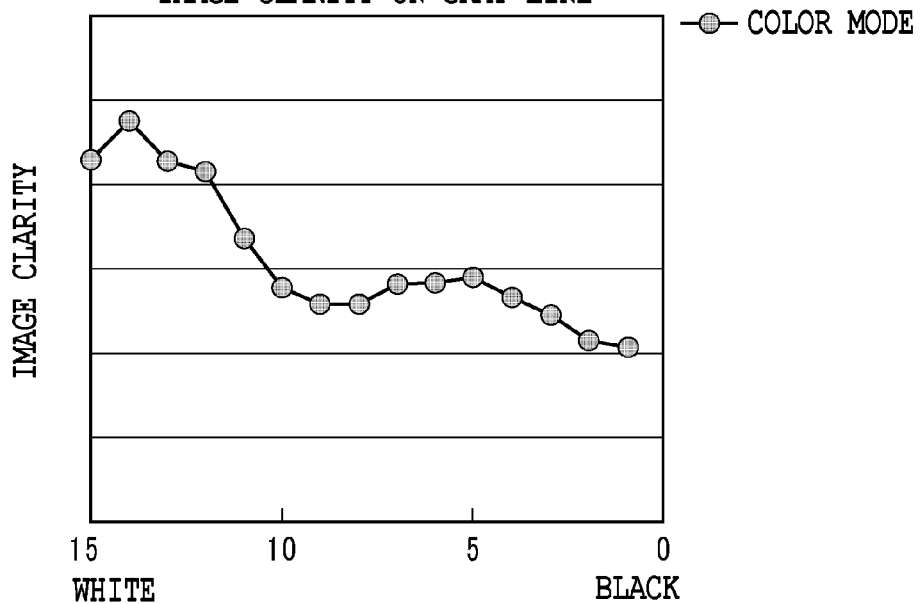
FIGS. 22A and 22B are schematic diagrams illustrating gloss measurement results.
Figure 22B:
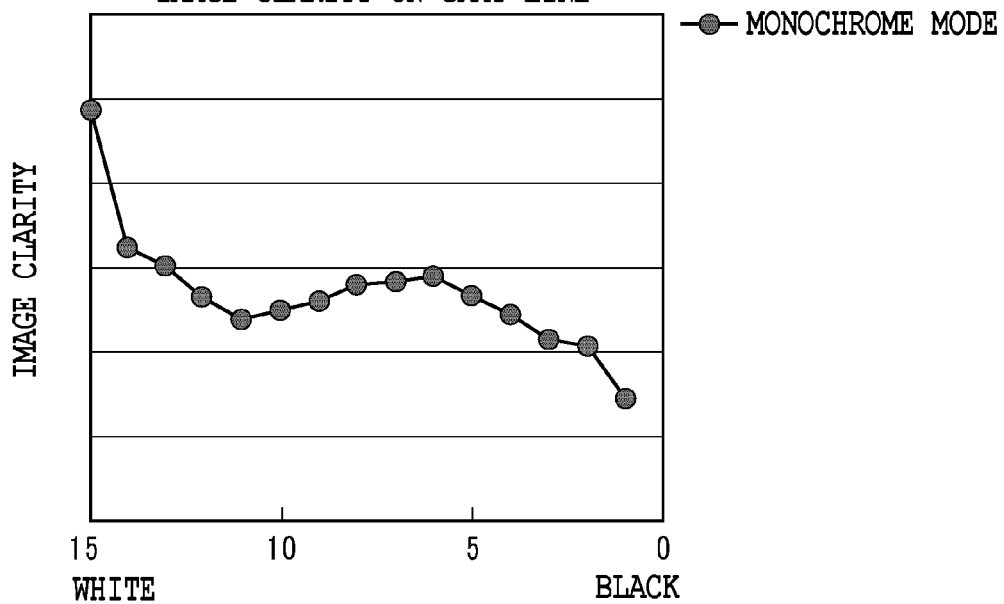

In addition, the image clarity of a gray line in the color mode as illustrated in FIG. 22A is better at intermediate gradation near the black point and the white point compared to the image clarity of a gray line in the monochrome mode as illustrated in FIG. 22B.

Note that although the description of the present embodiment indicates an example of not using the clear ink data CL1 at all in the color mode, the clear ink data CL1 may also be used appropriately while taking bronzing and image clarity into account. However, as indicated in the present embodiment, it is preferable to increase the effects of bronzing suppression in the monochrome mode by setting the rate of the data CL1 higher than in the color mode.

Furthermore, although the present embodiment illustrates an example of differentiating the rates of ink use amounts for the data CL1 and CL2 between the color mode and the monochrome mode, such differentiation may also be applied to other modes. For example, in a configuration having multiple color modes, a "bronzing suppression priority mode" and an "image clarity priority mode" may be provided, and respective rates of ink use amounts for the data CL1 and CL2 may be set for these modes. Likewise, in a configuration having multiple monochrome modes, a "bronzing suppression priority mode" and an "image clarity priority mode" may be provided, and respective rates of ink use amounts for CL1 and CL2 may be set for these modes.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-106991, filed May 8, 2012, which is hereby incorporated by reference herein in its entirety.

What is claimed is:

1. An image processing apparatus for forming an image on a unit area of a print medium by performing a printing operation of a first printing mode and a second printing mode using a print head for ejecting coloring ink comprising coloring material and clear ink to the print medium, said apparatus comprising:
    a setting unit configured to set a mode including a first and second mode; and
    a determining unit configured to determine an use amount of the coloring ink, a first use amount of the clear ink which is an use amount of the clear ink for the printing operation that starts applying the clear ink to the unit area before completing applying the use amount of coloring ink to the unit area, and a second use amount of the clear ink which is an use amount of the clear ink for the printing operation that starts applying the clear ink to the unit area after completing applying the use amount of coloring ink to the unit area, based on an image data representing a color of the image, according to the mode set by said setting unit, wherein
    said determining unit determines the first use amount and the second use amount, such that a ratio of the first use amount determined based on the image data representing a color of an intermediate gradation image to the second use amount determined based on the image data for the first printing mode is different from a ratio for the second printing mode, and
    the same type of the clear ink is used in the first printing mode and the second printing mode.

2. The image processing apparatus as claimed in claim 1, wherein the first printing mode is a color mode and the second printing mode is a monochrome mode.

3. The image processing apparatus as claimed in claim 1, wherein the ratio unit in the second printing mode is larger than that in the first printing mode.

4. The image processing apparatus as claimed in claim 1, wherein the printing operation of each of the first and second printing modes is an operation that performs scans by the print head to the print medium, the first use amount is an amount of the clear ink used in the same scan as a scan by the print head to the print medium in which the print head ejects the coloring ink for performing the printing operation, and the second use amount is an amount of the clear ink used in the scan after the last scan in which the print head ejects the coloring ink for performing the printing operation.

5. The image processing apparatus as claimed in claim 4, wherein the print head is provided with a first nozzle array in which a plurality of nozzles for ejecting the coloring ink are arranged in a predetermined direction intersecting a scan direction of the scan by the print head and a second nozzle array in which a plurality of nozzles for ejecting the clear ink are arranged in the predetermined direction, and the first nozzle array and the second nozzle array are arranged in the scan direction.

6. The image processing apparatus as claimed in claim 5, wherein the print medium is conveyed in the predetermined direction, the coloring ink is ejected from a first range of nozzles which is a part of nozzles in the first nozzle array, the clear ink of the second use amount is ejected from a second range of nozzles which is a part of nozzles in the second nozzle array, and the second range of nozzles is located downstream of the first range of nozzles in a conveying direction of the print medium.

7. The image processing apparatus as claimed in claim 6, wherein the clear ink of the first use amount is ejected from a range of nozzles in the second nozzle array that corresponds to the first range of nozzles.

8. The image processing apparatus as claimed in claim 1, further comprising the print head.

9. The image processing apparatus as claimed in claim 1, wherein the clear ink does not contain coloring material.

10. The image processing apparatus as claimed in claim 1, wherein a coloring material contained in the coloring ink is a pigment ink.

11. The image processing apparatus as claimed in claim 1, wherein the image data is RGB data.

12. An image processing apparatus for forming an image on a unit area of a print medium by performing a printing operation of a first printing mode and a second printing mode using a print head for ejecting coloring ink comprising coloring material and clear ink to the print medium, said apparatus comprising:
    a setting unit configured to set a mode including a first mode which is a color mode and a second mode which is a monochrome mode; and
    a determining unit configured to determine an use amount of the coloring ink, a first use amount of the clear ink which is an use amount of the clear ink for the printing operation that starts applying the clear ink to the unit area before completing applying the use amount of coloring ink to the unit area, and a second use amount of the clear ink which is an use amount of the clear ink for the printing operation that starts applying the clear ink to the unit area after completing applying the use amount of coloring ink to the unit area, based on an image data representing a color of the image, in a case where the second mode is set by said setting unit, wherein
    said determining unit determines the first use amount and the second use amount for the second mode such that with respect to a gray line showing gradations from a white to a black, which is defined by the image data, the first use amount decreases and the second use amount increases, from an intermediate gradation, the first use amount is greater than the second use amount in a white side of a predetermined gradation, and the second use amount is greater than the first use amount in a black side of the predetermined gradation.

13. An image processing apparatus for forming an image on a unit area of a print medium by performing a printing operation of a first printing mode and a second printing mode using a print head for ejecting coloring ink comprising coloring material and clear ink to the print medium, said apparatus comprising:

a setting unit configured to set a mode including a first and second mode; and a determining unit configured to determine an use amount of the coloring ink, a first use amount of the clear ink which is an use amount of the clear ink for the printing operation that starts applying the clear ink to the unit area before completing applying the use amount of coloring ink to the unit area, and a second use amount of the clear ink which is an use amount of the clear ink for the printing operation that starts applying the clear ink to the unit area after completing applying the use amount of coloring ink to the unit area, based on an image data representing a color of the image, according to the mode set by said setting unit, wherein said determining unit determines the first use amount and the second use amount, such that a ratio of the first use amount determined based on the image data representing a color of an intermediate gradation image to the and second use amount determined based on the image data for the first printing mode is different from a ratio for the second printing mode, the first printing mode is a color mode and the second printing mode is a monochrome mode, and the ratio for the second printing mode is larger than that in the first printing mode, and the same type of the clear ink is used in the first printing mode and the second printing mode.

* * * * *